US006329981B1

(12) United States Patent
Lin et al.

(10) Patent No.: US 6,329,981 B1
(45) Date of Patent: Dec. 11, 2001

(54) INTELLIGENT VIDEO MODE DETECTION CIRCUIT

(75) Inventors: Zhihao Lin, San Jose; Hsi-Sheng Chen, Fremont, both of CA (US)

(73) Assignee: NeoParadigm Labs, Inc., Milpitas, CA (US)

( * ) Notice: Subject to any disclaimer, the term of this patent is extended or adjusted under 35 U.S.C. 154(b) by 0 days.

(21) Appl. No.: 09/187,296

(22) Filed: Nov. 5, 1998

Related U.S. Application Data

(60) Provisional application No. 60/091,409, filed on Jul. 1, 1998.

(51) Int. Cl.[7] .......................... G09G 5/00; H04N 11/20; H04N 5/46

(52) U.S. Cl. .......................... 345/204; 348/441; 348/558

(58) Field of Search .................................. 345/132, 115, 345/204, 213, 99, 3, 302; 348/558, 521, 441, 554, 555

(56) References Cited

U.S. PATENT DOCUMENTS

| | | | | |
|---|---|---|---|---|
| 5,455,627 | * | 10/1995 | Eitzmann et al. | 348/441 |
| 5,534,940 | * | 7/1996 | Sato et al. | 348/558 |
| 5,592,187 | * | 1/1997 | Zenda | 345/213 |
| 5,675,355 | * | 10/1997 | Chiu et al. | 345/213 |
| 5,717,467 | * | 2/1998 | Shiki | 348/554 |
| 5,917,552 | * | 6/1999 | Van Court | 345/558 |
| 5,953,074 | * | 9/1999 | Reddy | 348/558 |
| 5,987,624 | * | 11/1999 | Eglit | 714/32 |
| 6,005,544 | * | 12/1999 | Eglit | 345/115 |
| 6,008,791 | * | 12/1999 | Arai et al. | 345/699 |
| 6,037,925 | * | 3/2000 | Kim | 345/99 |
| 6,078,317 | * | 6/2000 | Sawada | 345/699 |
| 6,118,486 | * | 9/2000 | Reitmeier | 348/441 |

* cited by examiner

*Primary Examiner*—Chanh Nguyen
*Assistant Examiner*—Paul A. Bell
(74) *Attorney, Agent, or Firm*—Squire, Sanders & Dempsey

(57) ABSTRACT

An apparatus for detecting the video mode of a video data, the apparatus capable of receiving a plurality of synchronous signals along with the transmission of the video data, comprises: a first counter stage capable of receiving the synchronous signals and generating a first counter stage output signal that represents the number of total lines in a frame of the video data; a second counter stage capable of receiving an active line indicator signal that indicates an active line in the video data, the second counter stage capable of generating a second counter stage output signal that represents the number of active lines in a frame of the video data; and a logic circuit coupled to the first counter stage and to the second counter stage, the logic circuit capable of detecting the video mode of the video data based upon the values of the first counter stage output signal and the second counter stage output signal.

68 Claims, 25 Drawing Sheets

Total Line Counter Stage 330

Active Line Counter Stage 335

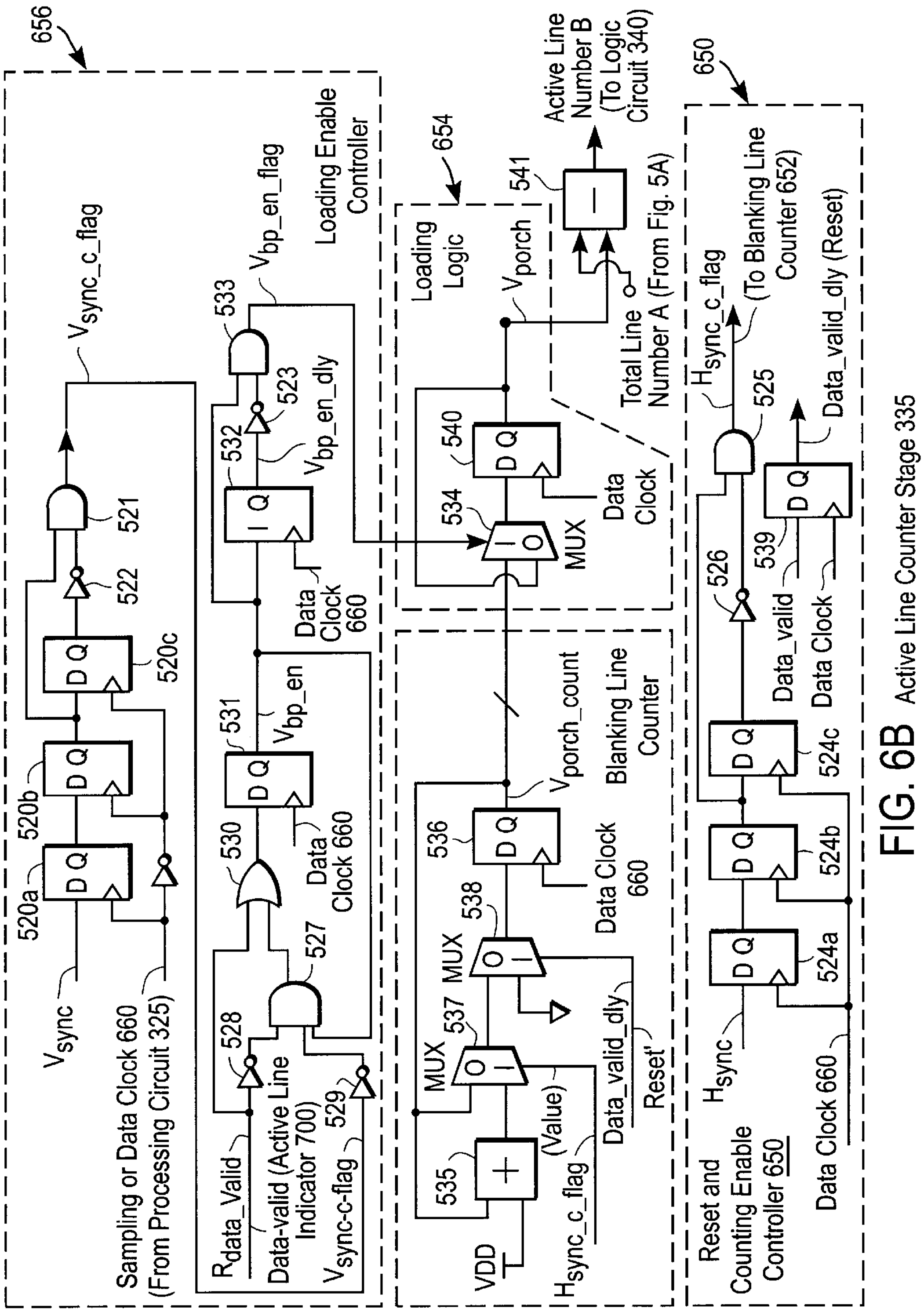
FIG. 6B Active Line Counter Stage 335

550

| (1) Total Line Threshold Values | (2) Corresponding Range LNRV | (3) Total Line Output Code 544 |
|---|---|---|
| (Z) Mode Z_t | | |
| (Z-1) Mode Z-1_t | TL_Range_Z-1 | Z |
| • • • • | • • • • | • • • • |
| (3) Mode 3_t | | |
| (2) Mode 2_t | TL_Range_2 | 3 |
| (1) Mode 1_t | TL_Range_1 | 2 |
| (0) Mode 0_t | TL_Range_0 | 1 |
| (a) <Mode 0_t | Invalid Range | 0 |

Z ≡ Positive Integer

FIG. 7B

555

| (1) Active Line Threshold Values | (2) Corresponding Range ALRV | (3) Active Line Output Code 546 |
|---|---|---|
| Mode Z_U | | |
| (Z) Mode Z_L | Active_Range_Z | Z |
| • • • | • • • | • • • |
| Mode 3_U | | |
| (3) Mode 3_L | Active_Range_3 | 3 |
| Mode 2_U | | |
| (2) Mode 2_L | Active_Range_2 | 2 |
| Mode 1_U | | |
| (1) Mode 1_L | Active_Range_1 | 1 |

Z ≡ Positive Integer

FIG. 7C

560

| | (1) Total Line Output Code Value 544 | (2) Active Line Output Code Value 546 | (3) Mode 345 |
|---|---|---|---|
| (0) | 0 | – | Invalid Mode |
| (1a) | 1 | 1 | Mode 1 |
| (1b) | 1 | Not 1 | Mode 0 |
| (2a) | 2 | 2 | Mode 2 |
| (2b) | 2 | Not 2 | Mode 1 |
| (3a) | 3 | 3 | Mode 3 |
| (3b) | 3 | Not 3 | Mode 2 |
| | • • • • | • • • • | • • • • |
| (Za) | Z | Z | Mode Z |
| (Zb) | Z | Not Z | Mode Z-1 |

Z ≡ Positive Integer

FIG. 7D

INTELLIGENT VIDEO MODE DETECTION CIRCUIT

CROSS-REFERENCE TO RELATED APPLICATION

This application claims priority to U.S. Provisional Application No. 60/091,409 to Zhihao Lin and Hsi-Sheng Chen, filed on Jul. 1, 1998 and entitled "Intelligent Video Mode Detection Circuit." U.S. Provisional Application No. 60/091,409 is fully incorporated herein by reference.

BACKGROUND OF THE INVENTION

1. Field of the Invention

The present invention relates generally to the field of digital electronics, and more particularly to an apparatus and method for detecting the video mode of a video signal from a graphics card.

2. Description of the Related Art

Various conventional electronic units, such as video displays or computer display units, receive and process video signals for eventual display. In a computer unit, a graphics card is typically used to generate analog video data for display on a cathode ray tube (CRT) display unit.

However, in recent years flat panel display units have been introduced in the marketplace and have gained popularity due to the many advantages of those units. For example, flat panel display units consume less power than conventional CRT display units. Flat panel display units are also relatively smaller in size and lighter in weight than CRT display units. Also, as flat panel technology improves, flat panel display units will more likely become less expensive than CRT display units. Additionally, LCD-based flat panel display units, in particular, expose users to less radiation emission than conventional CRT display units. Furthermore, unlike CRT display units, flat panel display units have no "flicker" which often causes eyestrain and headaches for many users. Moreover, unlike CRT display units that suffer from some bending and distortions near the edges of the viewable area of the CRT screen, flat panel images remain solid at the corners. The above-mentioned advantages (as well as the increasing popularity of flat panel based computer units) serve as incentives for designers to seek solutions that permit flat panel display units to replace CRT display units in desktop computer systems.

However, there are problems in integrating a computer unit with a flat panel display unit. Currently, notebook vendors use specifically designed graphic cards that output necessary control signals for driving LCD flat panel display units. In contrast, the graphic cards in conventional computer systems are not designed to generate the necessary control signals for driving LCD flat panel display units.

A video mode is defined by the timing parameters of the video signal. The timing parameters include the resolution value, the vertical timing parameters and the horizontal timing parameters, as described hereinbelow.

If a flat panel display unit is used in place of a CRT display unit in a computer system, the video mode of the video data from the computer unit must be determined so that processing circuitry can drive the flat panel display unit in order to display the video data. However, a graphics card can generate different modes. In addition, for video signals with the same resolution, different graphics cards may generate different timing parameters. Additionally, the video data from the computer graphics card must be converted into a format that is suitable for display in a flat panel unit. Thus, to integrate a flat panel display unit with a computer unit and expect both to function properly or optimally, it is necessary to detect the video mode correctly.

A prior attempt for automatically detecting the video mode of a video signal is disclosed in commonly-assigned U.S. patent application Ser. No. 08/876,846 to Biao Zhang and Jemm Yue Liang, filed Jun. 16, 1997 and entitled AUTOMATIC CLOCK RECOVERY SYSTEM FOR DISPLAY APPLICATIONS. Zhang discloses a method of detecting the video mode of a video signal based on the total number of horizontal synchronous (Hsync) pulses within one video frame. The total number of Hsync pulses within one frame of the video signal is defined as "total lines". U.S. patent application Ser. No. 08/876,846 is fully incorporated herein by reference.

However, Zhang's approach is unable to differentiate two different video modes that both have the same number of total lines per video frame. Zhang's approach is also unable to differentiate a first video mode from a second video mode wherein the first video mode has a larger number of total lines than the second video mode and wherein the first video mode has less "active lines" per video frame than the second video mode. An active line is one that contains video information and can be displayed on a screen and seen by an end-user.

Therefore, there is a need for an apparatus and method that will automatically and accurately detect the different video modes. There is also a need for an apparatus and method for differentiating two different video modes with the same number or a substantially close number of total lines per video frame. There is also a need for an apparatus and method for differentiating between at least two modes wherein the first mode has more total lines per video frame than the second mode, but has less active lines per video frame than the second mode. There is also a need for an apparatus and method that permit a computer with a typical graphics card to function with flat panel display units.

SUMMARY OF THE INVENTION

The present invention automatically detects the video mode of video data from any graphics card in a computer unit. The video mode can be used by a subsequent processing circuit to generate appropriate control signals for sampling the analog video data. The processing circuit also performs further processing of the video data for display on a flat panel device.

The present invention provides a method of determining the resolution of video data wherein the video data is transmitted along with a plurality of synchronous signals.

The method comprises the steps of: generating, in response to the synchronous signals, a first output signal that represents the number of total lines in a frame of the video data; generating a second output signal that represents the number of active lines in a frame of the video data; and generating a signal that represents the resolution of the video data based upon the number total lines per frame and active lines per frame of the video data.

The present invention further provides an apparatus for detecting the resolution of video data. The apparatus is capable of receiving a plurality of synchronous signals along with the transmission of the video data. The apparatus comprises: a first counter stage capable of receiving the synchronous signals and generating a first counter stage output signal that represents the number of lines in a frame of the video data; a second counter stage capable of receiving an active line indicator signal that indicates an active line in the video data, the second counter stage capable of generating a second counter stage output signal that represents the number of active lines in a frame of the video data; and a logic circuit coupled to the first counter stage and to the second counter stage, the logic circuit capable of detecting the video mode of the video data based upon the values of the first counter stage output signal and the second counter stage output signal.

The present invention can accurately distinguish the video modes with the same number or a substantially close number of total lines per frame of the video data. Additionally, the present invention overcomes the prior art problem of video mode detection in the case when a first video mode has a greater number of total lines than a second video mode, but wherein the first video mode has less active lines than the second video mode.

Since the present invention enables the automatic detection of a resolution of video data, the invention allows any particular flat panel display unit to function with any one of various computer units having graphics cards that can generate different video modes with standard and non-standard timing. Thus, the end user will be able to integrate a particular flat panel display unit with any one of various computer units with less difficulty and without the need to know the particular graphics card in the user's computer unit. The end user will also be able to integrate various flat panel display units with a particular computer unit.

These, together with the various ancillary advantages and features which will become apparent to those skilled in the art as the following description proceeds, are attained by these novel intelligent video mode detection circuits and methods, a preferred embodiment thereof shown with reference to the accompanying drawings, by way of example only, wherein:

BRIEF DESCRIPTION OF THE DRAWINGS

FIG. 6B is a schematic block diagram showing additional details of the active line counter stage of FIG. 6A;

FIG. 7B is a chart showing various output values of the logic that receives the total line number per video frame;

FIG. 7C is a chart showing various output values of the logic that receives the active line number per video frame;

FIG. 7D is a chart showing various output values (modes) of the decision logic of FIG. 7A;

DETAILED DESCRIPTION OF THE PREFERRED EMBODIMENTS

Figure 1A:
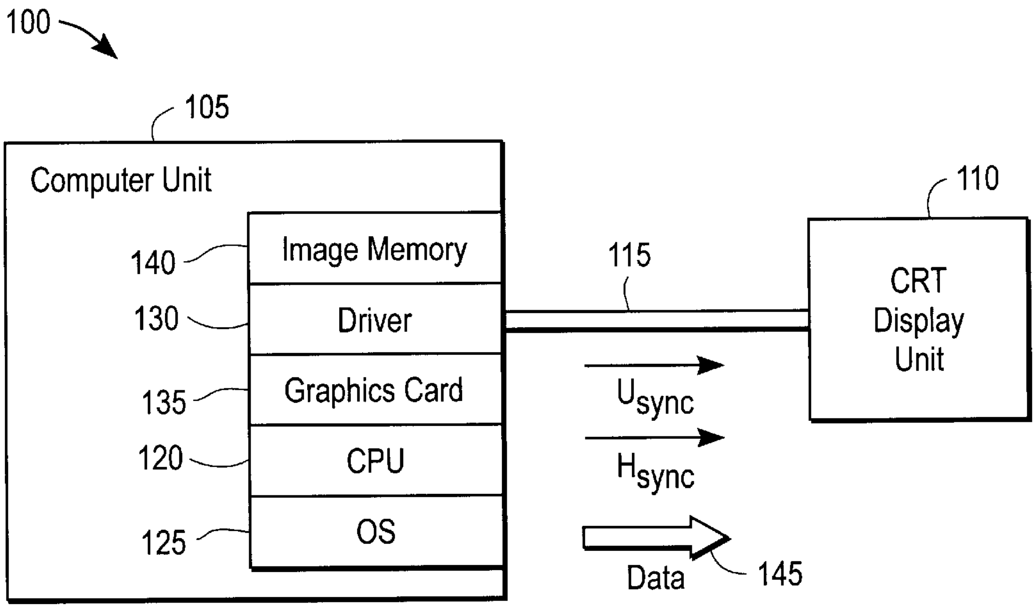
FIG. 1A (Prior Art)
FIG. 1A is a block diagram of a conventional computer system with a CRT display unit.
Figure 1B:
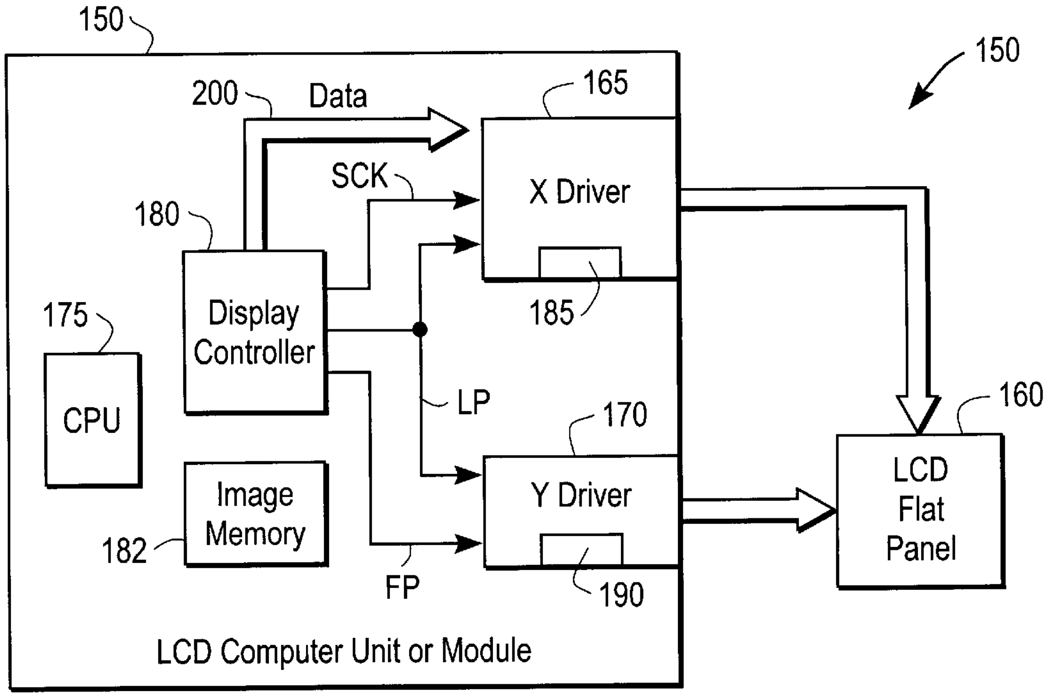
FIG. 1B (Prior Art)
FIG. 1B is a block diagram of a conventional LCD flat panel display system.

Referring in detail now to the drawings wherein similar parts or steps of the present invention are identified by like reference numerals, and initially referencing FIGS. 1A and 1B as a preamble for better understanding the need for the present invention, FIG. 1A is a block diagram of a conventional computer system 100 comprising a computer unit 105 and a CRT display device 110 coupled to the computer unit 105 via cable 115. The computer unit 105 includes a CPU 120, an operating system (OS) 125, a display device driver 130, a graphics card 135, and image memory 140.

The CPU 120 is capable of executing computer graphics application programs that generate graphics data. In turn, the graphics data define graphical elements that are to be displayed by the CRT display unit 110. The image memory 140 stores the graphics data until the graphics data is sequentially accessed by the graphics card 135 for output onto the CRT display unit 110.

The operating system 120 communicates with the CRT display unit 110 through the display device driver 130. The operating system 125 may be, for example, an operating system available from Microsoft Corporation of Redmond, Wash. or Apple Computers of Cupertino, Calif.

The graphics card 135 typically incorporates the video graphics array (VGA) display standard or the super video graphics adapter (SVGA) display standard. SVGA-based display units have a high pixel resolution of, for example, 1024 pixels across by 768 pixels down (i.e., 1024×768). The graphics card 135 is implemented in VLSI circuitry and is usually located on the main system board or on an expansion board of the computer unit 105. The graphics card 135 generates the video synchronization signals Hsync and Vsync wherein the Hsync and Vsync signals are required by the CRT display device 110 in order to display the data signal 145 In particular, the Hsync signal controls the substantially horizontal sweep of an electron beam across the screen of the CRT display unit 110. The electron beam moves horizontally from left to right on the screen and back again to the left of the screen, thereby forming an image line by line on the screen.

A pulse in the Hsync waveform indicates the end of a horizontal line on the CRT screen. When the electron beam reaches the end of a horizontal line, a horizontal blanking period occurs whereby the electron beam is suppressed as the beam moves back to the left side of the CRT screen.

The Vsync signal controls the vertical scan frequency wherein the vertical scan frequency is the number of video frames displayed on the screen per second. The Vsync signal provides an indicator to the CRT display unit 110 to begin a new screen, thereby sending the electron beam from the bottom right corner to the top left corner of the screen of the CRT display unit 110. During the vertical blanking period, the electron beam is suppressed as the electron beam moves from the bottom right corner to the top left corner of the CRT screen.

Reference is now made to FIG. 1B which is a block diagram of a conventional LCD display system 150. The LCD display system 150 comprises an LCD computer unit or module 155 and an LCD flat panel 160. The LCD computer unit 155 includes an X Driver 165, a Y Driver 170, a CPU 175, a display controller (graphics card) 180, and an image memory 182.

The X driver 165 includes a data shift register 185, while the Y driver 170 includes a scanning shift register 190. The X driver 165 and the Y driver 170 are driven/controlled by the following timing signals which are fully described hereinafter: shift clock pulse SCK, line pulse LP, and frame pulse FP. The line pulse LP corresponds to a horizontal synchronizing signal of display controller 180, while the frame pulse FP corresponds to a vertical synchronizing signal of display controller 180.

The display controller 180 sequentially accesses the graphics data stored in the image memory 182. The display controller 180 then outputs video data 200 for input into the data shift register 185. When the data shift register 185 receives the shift clock pulse SCK, the data shift register 185 will shift the stored video data 200. When the data shift register 185 receives the line pulse LP, the data shift register 185 will transfer data in parallel to the X driver 165 output stage. The X driver 165 output stage then applies the data to signal electrodes (not shown) in the LCD panel 160.

The scanning shift register 190 (in Y driver 170) provides output signals to scanning electrodes (not shown) in the LCD panel 160. When the scanning shift register 190 receives the line pulse LP, the frame pulse FP is shifted as data within the scanning shift register 190. Thus, the scanning electrodes are sequentially turned on in response to the line pulse LP being provided to the scanning shift register 190. The scanning electrodes of LCD panel 160 are turned on in sequence, but in synchronism with the data signals applied by the X driver to the signal electrodes of LCD panel 160.

Figure 2:
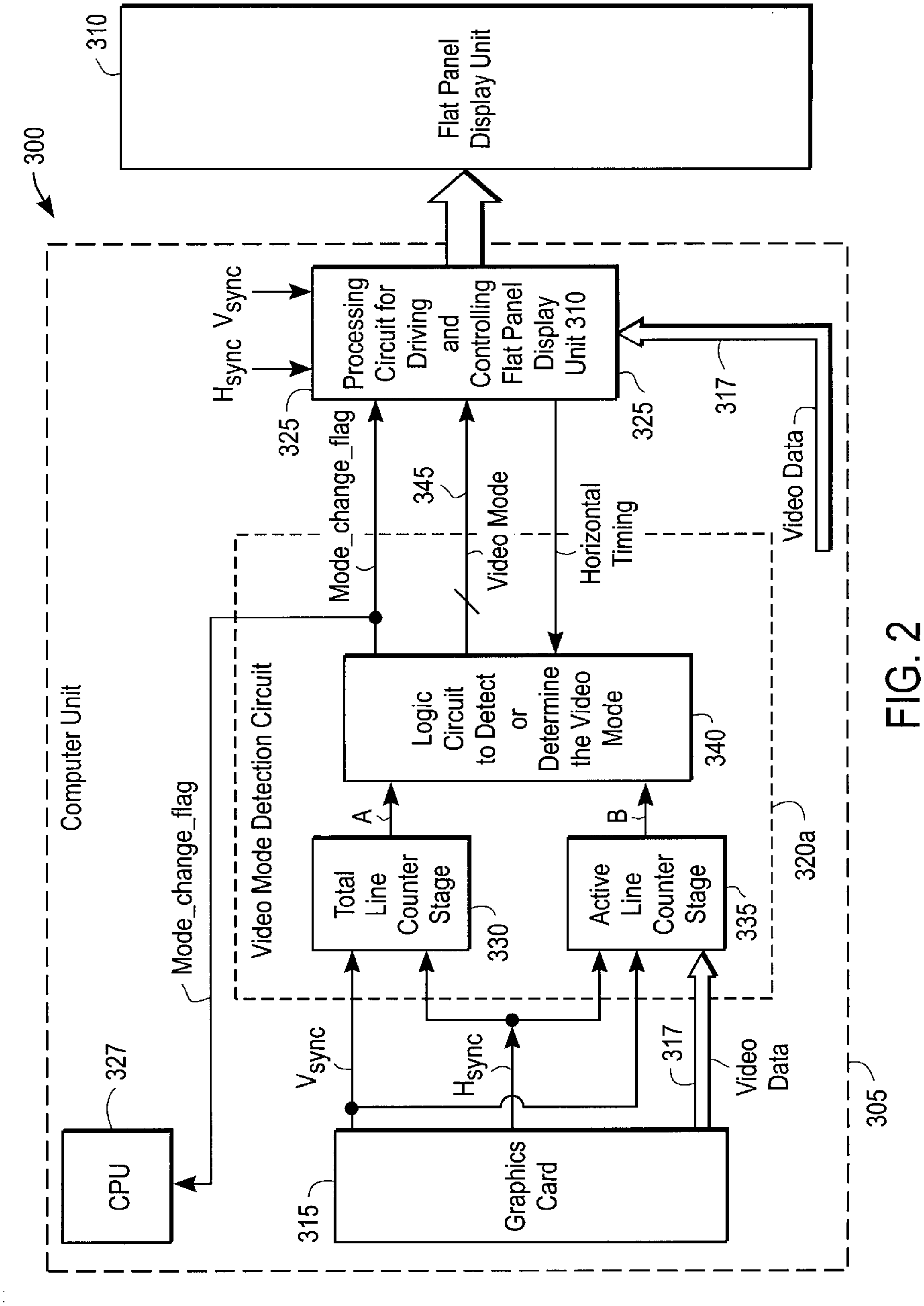
FIG. 2 is a block diagram of a computer system which includes a video mode detection circuit in accordance with a preferred embodiment of the present invention wherein the resolution of a video signal is determined based upon the number of total lines per video frame and the number of active lines per video frame.

Referring now to FIG. 2, there is shown a block diagram of a computer system 300 including the present invention. The computer system 300 comprises a computer unit 305 and a flat panel display unit 310. Typically, the flat panel display unit 310 is an LCD display unit of a conventional type.

The computer unit 305 includes a graphics card (adapter) 315, a video mode detection circuit 320*a*, a processing circuit 325, and a CPU 327. The computer unit 305 may also include other conventional components as identified with reference to FIGS. 1A and 1B. The graphics card 315 is capable of generating the vertical synchronous signal Vsync, the horizontal synchronous signal Hsync, and an analog video data 317. The graphics card 315 is any one of those commercially available from numerous graphics card vendors.

As further shown in FIG. 2, the video mode detection circuit 320*a* includes a total line counter stage 330 for counting the number of total lines per frame of video data 317, an active line counter stage 335 for counting the number of active lines per frame, and a logic circuit 340 for detecting or determining the video mode 345 of the video data 317. The number of total lines in a frame is determined by the number of Hsync pulses in a frame of the video data 317, while the number of active lines is defined as the number of lines with an active video (i.e., not blanking lines).

The video mode detection circuit 320*a* receives the Vsync, Hsync, and video data signal 317 from the graphics card 315, and generates the video mode 345 for input into the processing circuit 325. In particular, the total line counter stage 330 receives the Vsync and Hsync signals, while the active line counter stage 335 receives the Hsync and Vsync signals, and video data signal 317. The total line counter stage 330 outputs a signal A which represents the number of total lines per frame of the video data 317, while the active line counter stage 335 outputs a signal B which represents the number of active lines per frame of the video data 317. The logic circuit 340 receives the signal A, signal B, and the horizontal timing signal (horizontal timing parameters) generated by a clock recovery circuit (not shown) in the processing circuit 325. The logic circuit 340 outputs the video mode 345 that depends on the values of signal A, signal B, the horizontal timing parameters, and the vertical timing parameters (which are derived from signal A and signal B).

The video mode detection circuit 320*a* also outputs to the CPU 327 the Mode_change_flag signal, for signaling the change of input video mode to the CPU 327. As a result, the CPU 327 can decide whether to continue generating control signals to maintain the current pattern on the screen of the flat panel display unit 310 or to generate control signals to change the pattern on the screen in order to assist the active line counter stage 335 in deriving the correct value for signal B.

The processing circuit 325 receives the video mode signal 345 so that the processing circuit 325 can use the video mode signal 345 as a basis for further processing. For example, the processing circuit 325 receives the video mode signal 345 in order to generate appropriate clocking signals for driving the flat panel display unit 310. In particular, the processing circuit 325 includes a clock recovery circuit (not shown) that generates the clock according to the video mode, so that the analog video data 317 can be sampled at the correct frequency and phase and the quality of the display image can be optimized. The processing circuit 325 also performs formatting of the video data to match the format of the flat panel display unit 310, and generates control signals to drive the flat panel display unit 310.

Figure 3:
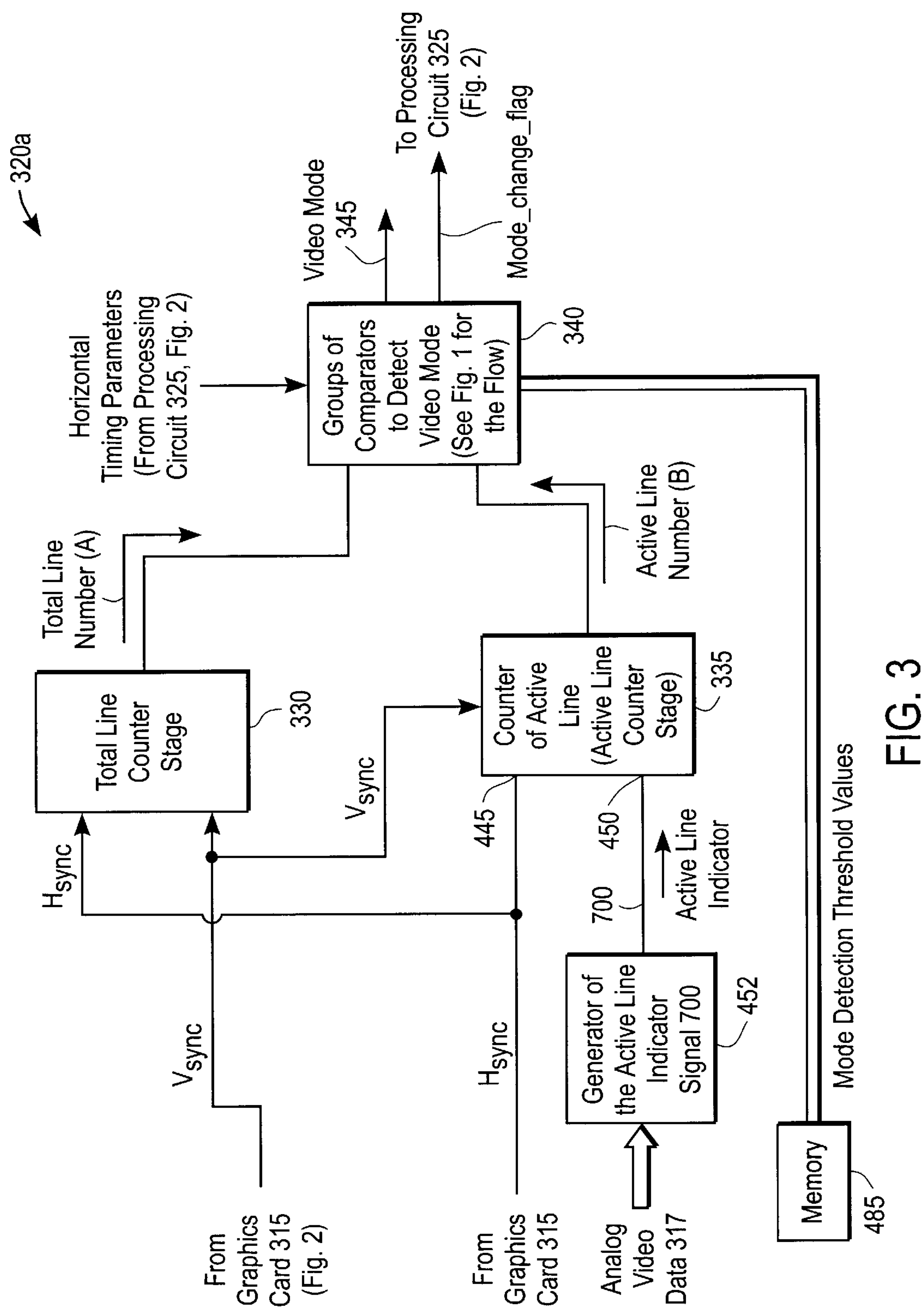
FIG. 3 is a schematic block diagram showing additional details of a first embodiment of the video mode detection circuit of FIG. 2.

FIG. 3 is a schematic block diagram that illustrates additional details of the video mode detection circuit 320*a* of FIG. 2. The total line counter stage 330 counts transitions which occur in the Hsync signal within one frame. On the other hand, the active line counter stage 335 has a first input 445 for receiving the Hsync signal from the graphics card 315 (FIG. 2). The second input 450 of the active line counter 335 is connected to a generator 452 for generating an active line indicator signal 700. The details and operation of the total line counter stage 330 and the active line counter stage 335 is described below in additional detail.

A register set 485 provides to the logic circuit 340 a plurality of video mode threshold values including the total line threshold values (Mode0_t, Mode1_t, . . . ModeZ_t in FIG. 9) and the active line threshold values (Mode1_L/Mode1_U, Mode2_L/Mode2_U, . . . ModeZ_L/ModeZ_U in FIG. 9). It is understood, however, that other suitable data storage devices may be used as an alternative for the register set 485. The logic stage 340 compares the above video mode threshold values with the total line number per video frame (signal A) and active line number per video frame (signal B) in order to determine the value of the video mode 345.

Figure 4A:
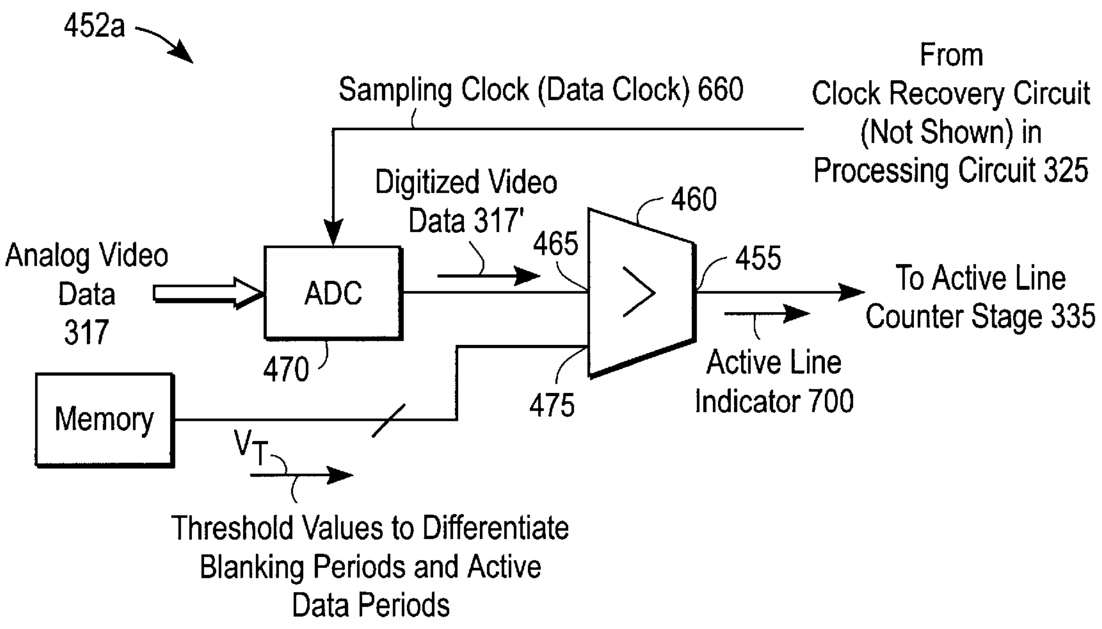
FIG. 4A is a schematic block diagram of one embodiment of the generator of the active line indicator signal of FIG. 3.

FIG. 4A is a schematic block diagram of a first embodiment of a generator 452*a* for generating the active line indicator signal 700, in accordance with the present invention. A comparator 460 has an output 455 for driving the active line indicator signal 700 into the active line counter stage 335 (FIG. 3), a first input 465 for receiving a digitized video data 317' from an analog-to-digital converter (ADC) 470, and a second input 475 coupled to a threshold memory device 480. The threshold memory device 480 may be a register, RAM, or other suitable storage devices. The ADC 470 receives the video data 317 from the graphics card 315 (FIG. 2) and transforms the video data 317 into the digitized video data 317' for input into the first input 465 of the comparator 460. The ADC 470 also receives the sampling clock (data clock) 660 from the clock recovery circuit (not shown) of the processing circuit 325 (FIG. 2). The threshold memory device 480 generates threshold values $V_T$ for input into the comparator 460 so that the comparator 460 can differentiate blanking periods from active data periods in the digitized video data 317' if noise is present in the digitized video data, as described further hereinbelow. For each active video period in the digitized video data 317', the comparator 460 will output the active line indicator signal 700 for input into the active line counter stage 335.

In one embodiment, the $V_T$ threshold value can be programmed by setting the values in the memory device 480. In an alternative embodiment, the $V_T$ threshold value is set at a fixed level by hardwiring the input 475 of comparator 460 to a fixed digital value. In another embodiment, the $V_T$ threshold value can be set by coupling the input 475 to a set of at least one chip terminal.

Figure 4B:
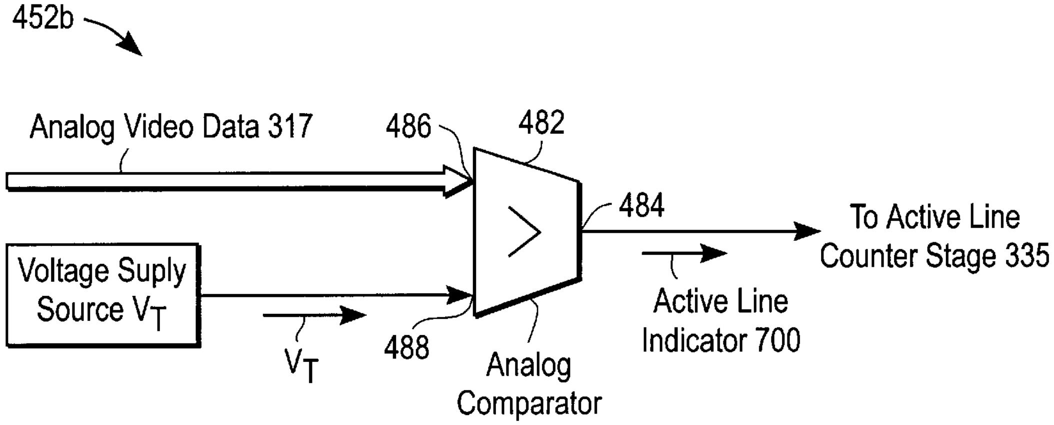
FIG. 4B is a schematic block diagram of a second embodiment of the generator of the active line indicator signal of FIG. 3.

FIG. 4B is a schematic block diagram of a second embodiment of a generator 452*b* for generating the active line indicator signal 700. An analog comparator 482 has an output 484 for driving the active line indicator signal 700 to the active line counter stage 335 (FIG. 3), a first input 486 for receiving the analog video data 317 from the graphics card 315, and a second input 488 coupled to a threshold voltage source V+ which is set at a predetermined voltage level. If the video data ranges between 0 to 1 volt, then the V+ value may be set to, for example, 0.3 volt. The analog comparator 482 will compare the value of the analog video data 317 with the value of threshold voltage source V+ so that the analog comparator 482 differentiates a blanking interval from an active video period in the video data 317 if the video data 317 contains noise. For each active video period in the video data 317, the analog comparator will output the active line indicator signal 700 for input into the active line counter stage 335.

Figure 5A:
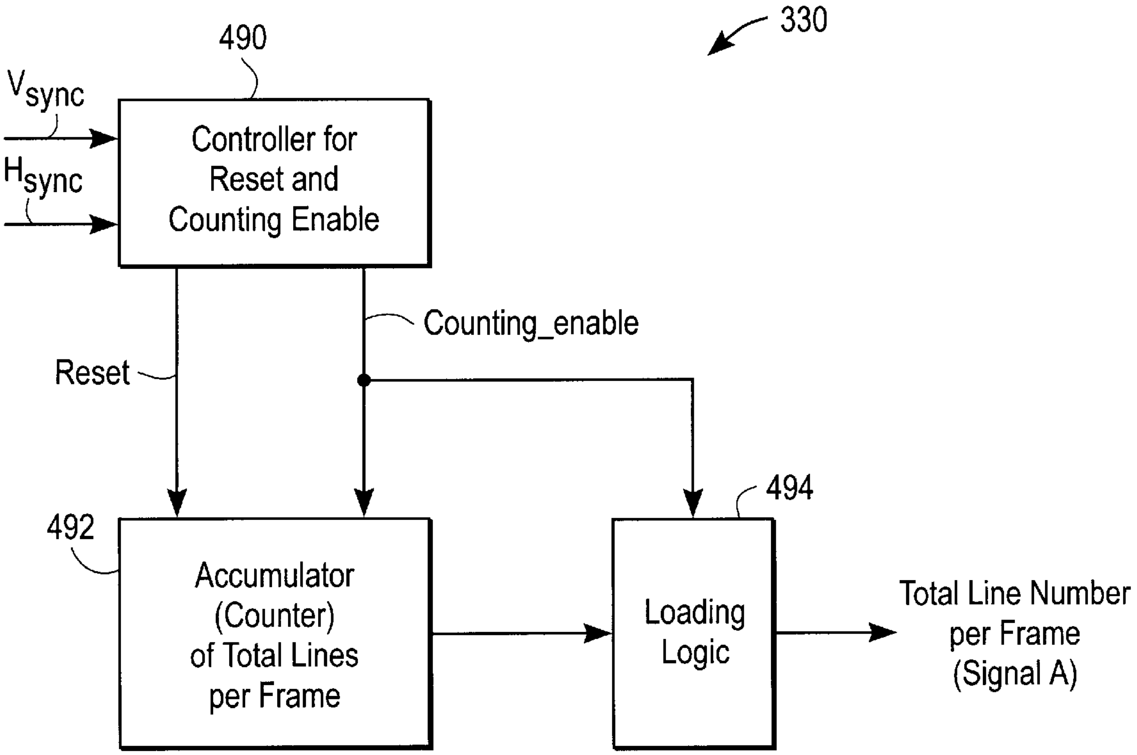
FIG. 5A is a schematic block diagram of one embodiment of the total line counter stage of FIG. 3.

FIG. 5A is a schematic block diagram of one embodiment of the total line counter stage 330 in accordance with the present invention. The counter stage 330 includes a controller 490, an accumulator 492, and a loading logic (total line output logic) 494. The controller 490 generates the control signals such as "reset" and counting enable signal. The controller 490 generates the "reset" signal to reset the accumulator 492 to an initial or zero value so that another counting process can be started. The controller 490 also generates the counting_enable signal which enables the counting by the accumulator 492. When the counting enable signal is not active, the accumulator (counter) 492 stops counting. This stable value in the accumulator 492 is then loaded to the loading logic 494. The register (flip flop 517) in loading logic 494 then stores the value of the total line number per frame (signal A).

Figure 5B:
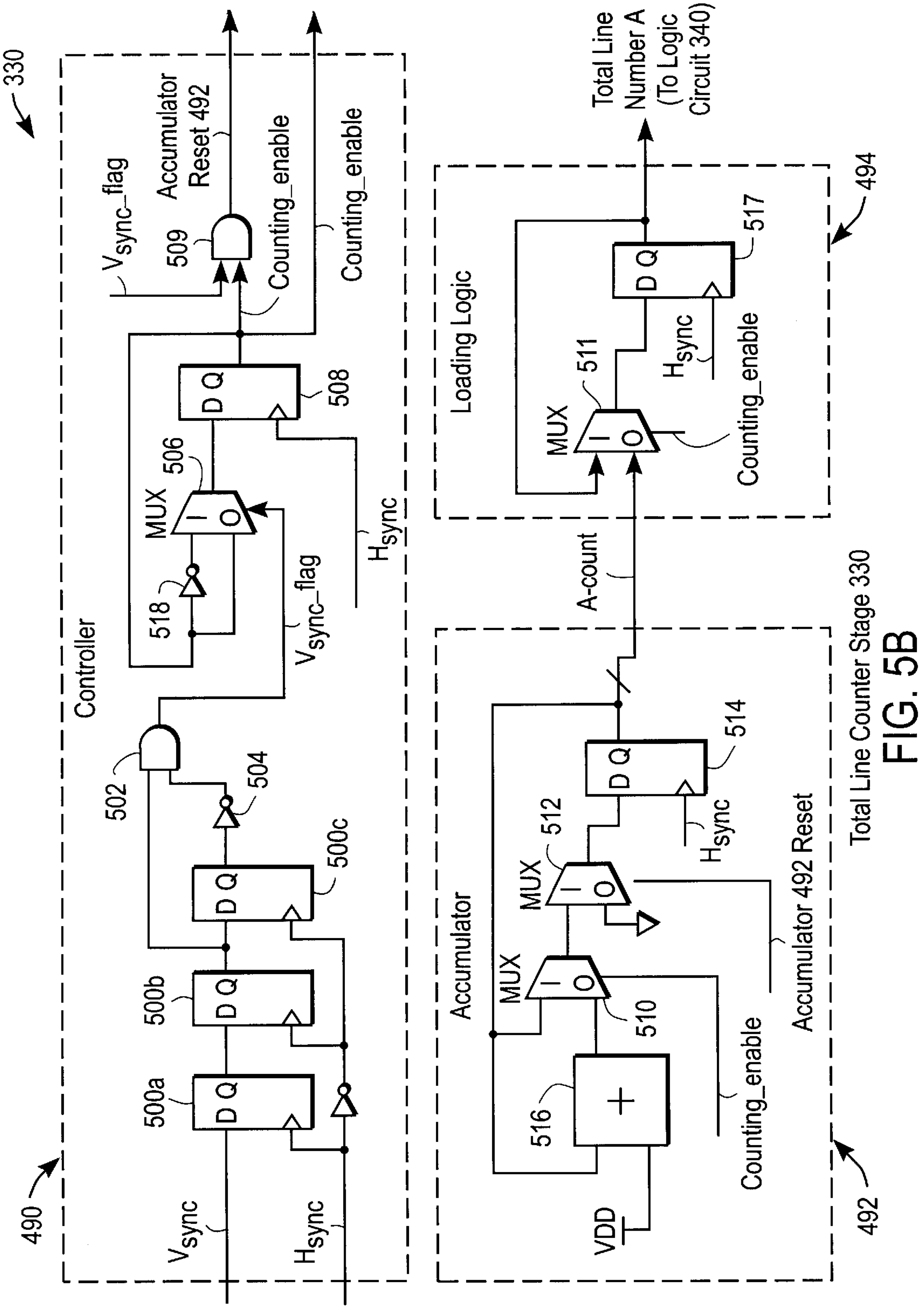
FIG. 5B is a schematic block diagram showing additional details of the total line counter stage of FIG. 5B.

FIG. 5B is a schematic circuit diagram of an example of the total line counter stage 330 of FIG. 5A. A plurality of flip-flops 500*a*, 500*b*, and 500*c* are coupled in series wherein the clock input of flip-flop 500*a* receives the Hsync signal and the D input of flip-flop 500*a* receives the Vsync signal. The clock inputs of flip-flops 500*b* and 500*c* receive an inverted Hsync signal. An AND gate 502 has a first input coupled to the Q output of the second flip-flop 500*b*, a second input coupled to the Q output of the third flip-flop 500*c* via an inverter 504, and an output which generates a signal Vsync_flag to control the multiplexer 506. The Vsync_flag signal is a flag of Vsync synchronous to Hsync. In turn, the multiplexer 506 has an output coupled to a D input of flip-flop 508, a first input coupled to the Q output of flip-flop 508 via inverter 518, and a second input coupled to the Q output of the flip-flop 508.

The flip-flop 508 generates the counting_enable signal for controlling the multiplexers 510 and 511 in the accumulator 492 and loading logic 494, respectively. An AND gate 509 receives the Vsync_flag and counting_enable signal and outputs the accumulator 492 reset signal. This accumulator 492 reset signal controls the multiplexer 512 in accumulator 492.

A flip-flop 514 has an input coupled to the output of an adder 516 via multiplexer 510 and 512. The output of flip-flop 514 stores the result of accumulator 492 and is coupled to one input of multiplexer 511 and to the adder 516. A flip-flop 517 has an input coupled to the output of the multiplexer 511 and an output coupled to the other input of multiplexer 511. The output of the flip-flop 517 is the signal A indicating the total line number per frame of the video signal 317. Notice that in this implementation, the counting_enable signal is low active. However, it is understood that the counting_enable signal can also be high active. The operation of the total line counter stage 330 is discussed further hereinbelow with reference to the timing diagram of FIG. 8C.

Figure 6A:
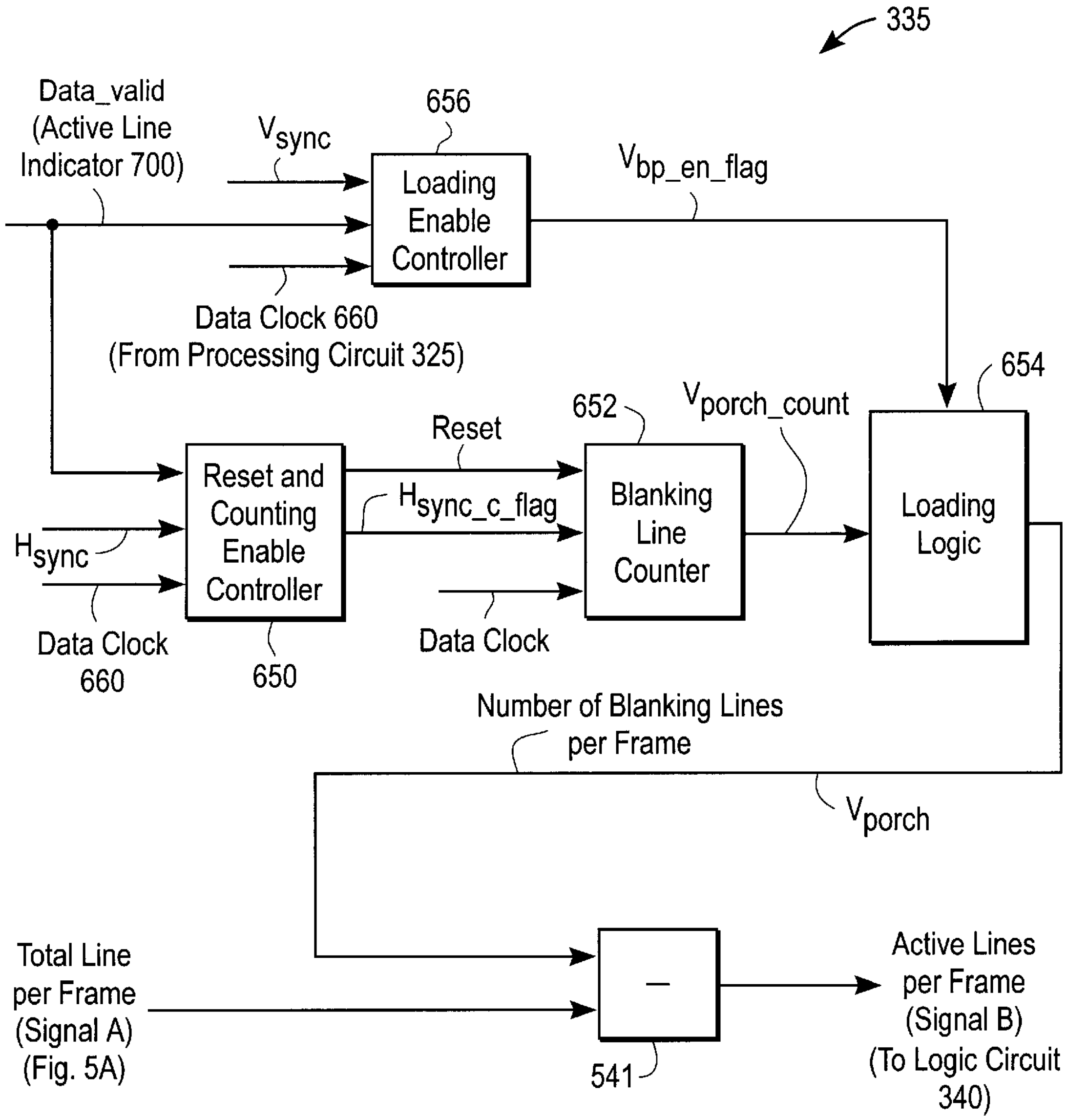
FIG. 6A is a schematic block diagram of one embodiment of the active line counter stage of FIG. 3.

FIG. 6A is a schematic block diagram of one embodiment of the active line counter stage 335 in accordance with the present invention. A reset and counting enable controller 650 receives the Hsync signal, the data_valid signal, and the data clock (sampling clock) 660 and outputs the control signals for blanking line counter 652. The reset and counting enable controller 650 output includes the enable signal Hsync_c_flag to enable the blanking line counter 652 to count blanking lines in a video frame and a reset signal (Reset') for resetting this counter 652. The blanking line counter 652 outputs a signal Vporch_count to the loading logic (active line output logic) 654. A loading enable controller 656 generates a signal called Vbp_en_flag which controls the loading of the Vporch_count from blanking line counter 652 to the loading logic 654 and which enables the loading logic 654 to output the Vporch signal that represents the number of blanking lines per video frame. The subtractor 541 subtracts the Vporch signal from the total lines per frame (signal A) to generate the active lines per frame (signal B).

FIG. 6B is a schematic circuit diagram of one example of the active line counter stage 335 of FIG. 6A. The details of the loading enable controller 656 is first described. A plurality of flip-flops 520*a,* 520*b,* and 520*c* are coupled in series and are configured to receive the Vsync signal and the relatively high frequency sampling clock (data clock) 600 that is generated from the processing circuit 325 (FIG. 2). An AND gate 521 has a first input coupled to the output of the flip-flop 520*b,* a second input coupled to the output of the flip flop 520*c* via inverter 522. The output of the AND gate 521 generates the Vsync_c_flag.

An AND gate 527 has a first input for receiving the active line indicator signal 700 (data_valid signal) via inverter 528 and a second input for receiving the Vsync_c_flag signal via inverter 529. An OR gate 530 has a first input for receiving the data_valid signal, a second input coupled to the output of the AND gate 527, and an output coupled to the D input of flip flop 531. The flip flop 531 drives the signal Vbp_en to the D input of flip flop 532, to an input of AND gate 533, and to an input of the AND gate 527. The flip flop 532, in turn, drives the delayed signal, Vbp_en_dly, into the second input of the AND gate 533 via inverter 523. The AND gate 533 generates the signal Vbp_en_flag which is the loading enable signal to control the multiplexer 534.

The details of the reset and counting enable controller 650 is now described. The active line counter stage 335 further includes a plurality of flip-flops 524*a,* 524*b,* and 524*c* that are coupled in series and are configured to receive the Hsync signal and the data clock 660 from the processing circuit 325 (FIG. 2). An AND gate 525 has a first input coupled to the output of the flip-flop 524*b,* a second input coupled to the output of the flip flop 524*c* via inverter 526, and an output for generating the counting enable signal Hsync_c_flag. A flip-flop 539 has a D input for receiving the data_valid signal (active line indicator 700), a clock input for receiving the data clock 660, and an output for generating the data_valid_dly (Reset') signal that is driven into the blanking line counter 652.

The blanking line counter 652 includes an adder 535 which has a first input coupled to the Q output of a flip flop 536 and a second input which receives a high logic level signal from a voltage source (e.g., VDD). A multiplexer 537 has a first input coupled to the Q output of flip flop 536, a second input coupled to the output of adder 535, and is controlled by the Hsync_c_flag signal. The multiplexer 537 has an output coupled to a first input of a multiplexer 538. The multiplexer 538 has a second input coupled to ground and an output coupled to the D input of the flip flop 536 and is controlled by the reset signal data_valid dly (Reset') which is generated by the flip flop 539.

The multiplexer 534 has a first input coupled to the Q output of flip flop 536, a second input coupled to the output of a flip flop 540, and an output coupled to the D input of flip flop 540. The flip flop 540 drives the Vporch signal into an input of subtractor 541. The total line counter stage 330 (FIG. 2) drives the total line number per frame (signal A) into another input of the subtractor 541. The subtractor 541 generates the active line number per frame (signal B) for input into the logic circuit 340 (FIG. 2). The operation of the active line counter stage 335 in FIG. 6B is discussed further below with reference to the timing diagram of FIG. 8D.

Figure 7A:
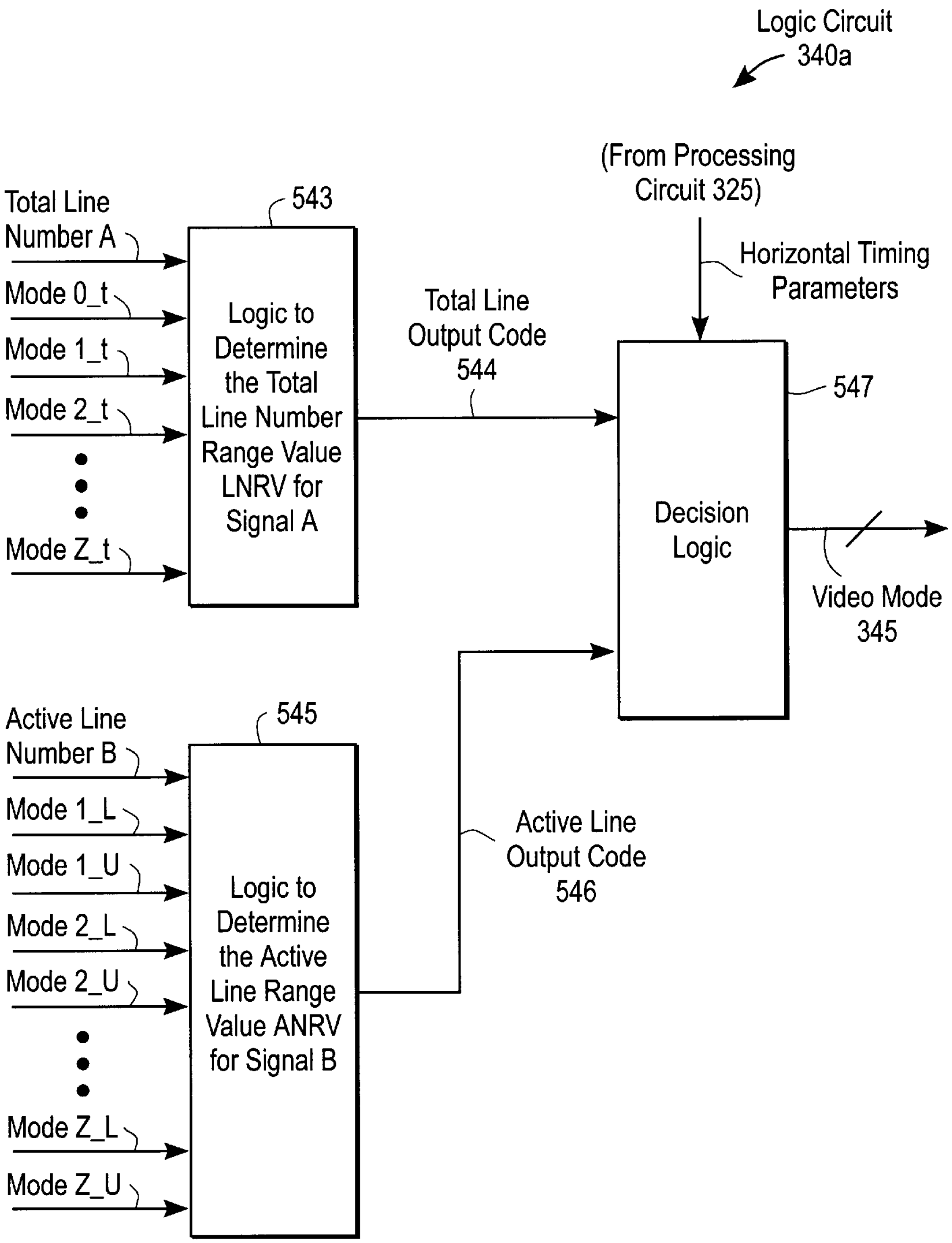
FIG. 7A is a functional block diagram of a first embodiment of the logic circuit of FIG. 2 wherein the logic circuit is capable of comparing the total lines per video frame (signal A) with a plurality of total line threshold values and comparing the active lines per video frame (signal B) with a plurality of active line threshold values.

Referring now to FIG. 7A, there is shown a functional block diagram of a logic circuit 340*a* which is capable of generating the video mode 345 based upon the total lines per video frame (signal A), active lines per video frame (signal B), and the horizontal timing signal (horizontal timing parameters from processing circuit 325). The logic circuit 340*a* is one embodiment of the logic circuit 340 that is shown in FIG. 2. The logic circuit 340*a* is also an example of a circuit that can implement the method shown in FIG. 9 for determining the video mode of a video data.

The logic circuit 340*a* advantageously determines the video mode of a video signal by comparing the total lines per frame (signal A) of the video signal with a plurality of total line threshold values Mode0_t . . . ModeZ_t and by comparing the active lines per frame (signal B) of the video signal with a plurality of active line threshold values Mode1_L/Mode1_U . . . ModeZ_L/ModeZ_U that are provided by the register set 485 (FIG. 3).

The logic circuit 340*a* includes a logic stage 543 for receiving the total line number per frame (signal A) and the total line threshold values Mode0_t . . . Mode Z-t, and for generating a total line output code 544 based upon the comparison of values of signal A and the total line threshold values. A logic stage 545 receives the active line number per frame (signal B) and the active line threshold values Mode1_L/Mode1_U . . . ModeZ_L/ModeZ_U and generates an active line output code 546 based upon the comparison of values of signal B and the active line threshold values. A decision logic 547 generates the mode 345 based upon the values of the total line output code 544, the active line output code 546, and the horizontal timing parameters, as described immediately hereinafter.

Reference to FIGS. 7B, 7C, and 7D for describing the operation of the logic circuit 340*a* in FIG. 7A. FIG. 7B is a chart 550 with a column (1) that lists the total line threshold values Mode0_t . . . ModeZ_t, a column (2) listing range values LNRV that correspond to intervals among the total line threshold values in column (1), and a column (3) listing total line output code values 544 corresponding to the range values LNRV in column (2).

Similarly, chart 555 in FIG. 7C includes a column (1) that lists the active line threshold values, a column (2) that lists range values ALRV that correspond to intervals among the active line threshold values in column (1), and a column (3) listing active line output code values 546 corresponding to the range values ALRV in column (2).

Chart 560 in FIG. 7D includes a column (1) that lists examples of total line output code values 544, a column (2) that lists examples of active line output code values 546, and a column (3) listing mode values 345 based upon the values in column (1) and column (2).

As an example, assume that the logic stage 543 determines that the total lines per frame (signal A) is less than the total line threshold value Mode0_t, as shown in chart 550, row (a) and column (1). Since the total lines per frame does not exceed the threshold value Mode0_t, an invalid range exists (chart 550, row (a), column (2)). The logic stage 543 outputs a total line output code 544 of 0 value (chart 550, row (a), column (3)). Based on the 0 value of the total line output code 544, the decision logic circuit 547 then outputs an invalid mode indicator (chart 560, row (0)).

As a further example, assume that the logic stage 543 detects the total line number per frame (signal A) with a value between Mode0_t and Mode1_t (i.e., Mode0_t<A<Mode1_t). In row (0) of chart 550, for Mode0_t<A<Mode1_t, the corresponding LNRV range in column (2) is TL_Range_0 and, thus, the corresponding value of the total line output code 544 in column (3) is 1. Assume further that the logic stage 545 detects the active lines per frame (signal B) with a value between Mode1_L and Mode1_U (i.e., Mode1_L<B<Mode1_U). In row (1) of chart 555, the corresponding ALRV range in column (2) is Active_Range_1 and, thus, the corresponding value of the active line output code 546 in column (3) is 1. If the condition, Mode1_L<B<Mode1_U, does not exist, then the corresponding value of the active line output code 546 is "not 1".

For the previous example above, a total line output code value 544 of 1 and an active line output code value 546 of 1 will cause the decision logic 547 to output Mode 1 (see chart 560, row (1a)). In contrast, a total line output code value 544 of 1 and an active line output code value 546 of "not 1" will cause the decision logic 547 to output Mode 0 (see chart 560, row (1b)).

The process, as described by the examples above, is also used by the decision logic 547 for generating the values for Mode 1, Mode 2, . . . Mode Z.

Figure 7E:
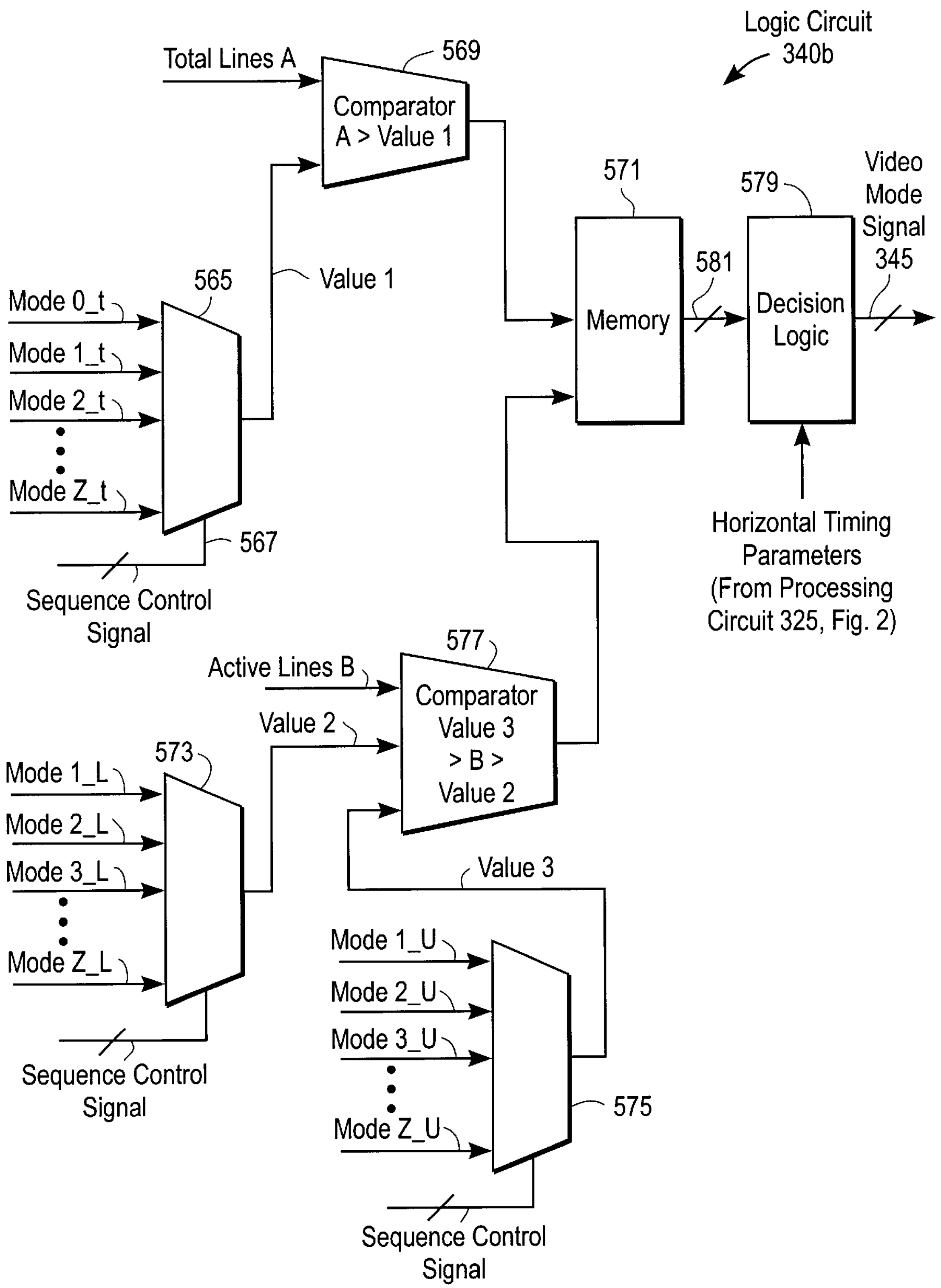
FIG. 7E is a functional block diagram of a second embodiment of the logic circuit of FIG. 2 wherein the logic circuit compares the values of signal A and signal B with threshold values to determine the video resolution.

FIG. 7E shows a logic circuit 340*b* that is capable of generating a video mode 345 in accordance with another embodiment of the present invention. A time-domain multiplexer 565 receives the total line threshold signals Mode0_t . . . ModeZ_t and outputs the total line threshold signals in sequence as the "Value1" signal. A sequence control signal via line 567 may be used to control the sequential output of the time-domain multiplexer 565.

Alternatively, stage 565 may be formed by buffer/delay elements so that each of the total line threshold values Mode0_t . . . ModeZ_t are output in sequence as "Value1". Other suitable elements may be used for stage 565.

A comparator 569 receives the total lines per frame (signal A) and the Value1 signal. Therefore, the comparator 569 compares signal A sequentially with each of the total lines threshold values Mode0_t . . . ModeZ_t. Thus, at time a0, the total line number (signal A) is compared with the total line threshold value Mode0_t. At subsequent time a1, signal A is compared with the total line threshold value Mode1_t. At time aZ, the signal A is compared with the total line threshold value ModeZ_t wherein Z is any integer value. The sequential comparison of signal A with the total line threshold values Mode0_t . . . ModeZ_t is summarized in Table 1. The results of comparison will be stored in the memory device 571. However, when the decision logic 579 determines that the signal A is within a particular range defined by one of the threshold values Mode0_t . . . ModeZ_t, subsequent comparisons between signal A and other total line threshold values is preferably not performed.

TABLE 1

| time | condition |
|---|---|
| time a0 | A < Mode0_t |
| time a1 | A < Mode1_t |
| time a2 | A < Mode2_t |
| time a3 | A < Mode3_t |
| * | * |
| * | * |
| time aZ | A < ModeZ_t |

A time-domain multiplexer (or buffer/delay stage) 573 receives the active line lower threshold values Mode1_L . . . ModeZ_L and outputs each of the active line lower threshold values in sequence as the Value2 signal. Similarly, a time-domain multiplexer (or buffer/delay stage 575) receives the active line upper threshold values Mode1_U . . . ModeZ_U and outputs each of the active line upper threshold values in sequence as the Value3 signal. A comparator 577 sequentially determines if the signal B is within one of the active line threshold values Mode1_L/Mode1_U . . . ModeZ_L/ModeZ_U, as summarized in Table 2.

TABLE 2

| time | condition |
|---|---|
| time b1 | Mode1_L < B < Mode1_U |
| time b2 | Mode2_L < B < Mode2_U |
| time b3 | Mode3_L < B < Mode3_U |
| time b4 | Mode4_L < B < Mode4_U |
| * | * |
| * | * |
| time bZ | ModeZ_L < B < ModeZ_U |

The memory 571 receives and buffers the outputs of the comparators 569 and 577. The decision logic 579 then accesses the memory 571 in order to receive the output 581 of the memory 571. Based upon the value of the memory 571, the decision logic 579 may output a video mode signal 345, including a resolution value that indicates the video resolution of a video signal. In Table 3, an example is shown if the video mode signal 345 includes a 4-bit resolution value. A resolution value of 1111 has been arbitrarily chosen to correspond to an invalid mode.

Assume, for example, the logic circuit 340*b* will support a minimum resolution value of 640×350. The total line threshold value Mode0_t will therefore have a value equal to about 350. If the signal A falls under the condition, A<Mode0_t, then the logic circuit 340*b* will indicate an invalid mode.

TABLE 3

| video mode | resolution value of signal 345 |
|---|---|
| Mode 0 | 0000 |
| Mode 1 | 0001 |
| Mode 2 | 0010 |
| Mode 3 | 0011 |
| Mode 4 | 0100 |
| Mode 5 | 0101 |
| * | * |
| * | * |
| * | * |
| invalid mode | 1111 |

Table 4 lists examples of video resolutions that can be supported (detected) by the present invention. Based on the video resolutions listed in Table 4, the values for Mode0_t . . . ModeZ_t and for Mode1_L/Mode1_U . . . ModeZ_L/ModeZ_U may, for example, be programmed as shown in Table 5 and Table 6, respectively. It is understood based upon the teachings of the present invention herein that the values in Tables 4, 5, and 6 may be set to other suitable values.

TABLE 4

| parameter | examples of corresponding video resolution |
|---|---|
| Mode 0 | 640 × 350 |
| Mode 1 | 720 × 400 |
| Mode 2 | 640 × 480 |
| Mode 3 | 800 × 600 |
| Mode 4 | 1024 × 768 |
| Mode 5 | 1280 × 1024 |
| Mode 6 | 1600 × 1200 |
| * | * |
| * | * |
| Mode Z | programmable value |

TABLE 5

| parameter | Total Line Number per frame (programmable threshold values) |
|---|---|
| Mode0_t | 350 |
| Mode1_t | 455 |
| Mode2_t | 500 |
| Mode3_t | 610 |
| Mode4_t | 768 |
| Mode5_t | 1024 |
| Mode6_t | 1250 |
| * | * |
| * | * |
| * | * |
| ModeZ_t | programmable value |

TABLE 6

| parameter | Active Line Number per frame (programmable threshold values) |
|---|---|
| Mode1_L | 398 |
| Mode1_U | 402 |
| Mode2_L | 476 |
| Mode2_U | 484 |
| Mode3_L | 597 |
| Mode3_U | 603 |
| Mode4_L | 766 |
| Mode4_U | 771 |
| Mode5_L | 1021 |

TABLE 6-continued

| parameter | Active Line Number per frame (programmable threshold values) |
|---|---|
| Mode5_U | 1027 |
| Mode6_L | 1197 |
| Mode6_U | 1203 |
| Mode7_L | programmable value |
| Mode7_U | programmable value |
| * | * |
| * | * |
| ModeZ_L | programmable value |
| ModeZ_U | programmable value |

The values for Mode1_L/Mode1_U . . . ModeZ_L/ModeZ_U may be set based on the standard resolution values or based on the set of resolution values that the user would prefer to differentiate. Alternatively, Mode1_L/Mode1_U . . . ModeZ_L/ModeZ_U may be set arbitrarily to other suitable values.

Figure 7F:
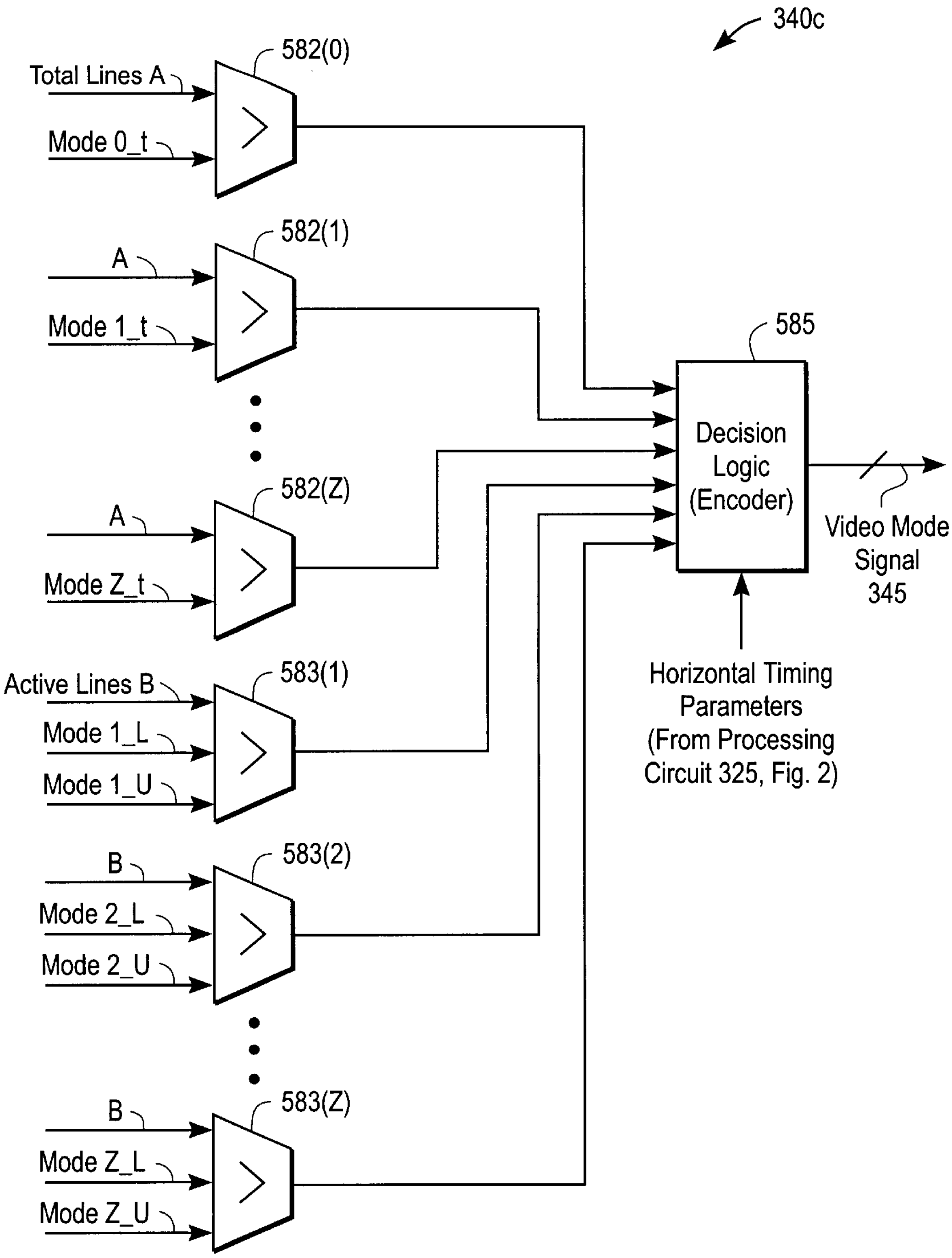
FIG. 7F is a functional block diagram of a third embodiment of the logic circuit of FIG. 2 wherein the logic circuit compares the total lines per video frame (signal A) with a plurality of total line threshold values to determine the video resolution.

FIG. 7F is a functional block diagram of a logic circuit 340*c* in accordance with another embodiment of the present invention. The comparators 582(0), 582(1), . . . 582(Z) each receives the total lines per frame value (signal A). The comparator 582(0) compares the values of signal A and the total line threshold value Mode0_t, while the comparator 582(1) compares the values of signal A and the total line threshold value Mode1_t. Similarly, the comparator 582(Z) compares the values of signal A with ModeZ_t wherein Z is any positive integer value.

The comparators 583(1), 583(2), . . . 583(Z) each receives the active lines per frame value (signal B). The comparator 583(1) compares the values of signal B and the active line threshold values Mode1_L/Mode1_U, while the comparator 583(2) compares the values of signal B and the active line threshold values Mode2_L/Mode2_U. Similarly, the comparator 583(Z) compares the values of signal B with ModeZ_L/ModeZ_U.

The decision logic (encoder) 585 receives the outputs of the comparators 582(0), 582(1), . . . 582(Z) and 583(1), 583(2), . . . 583(Z) and outputs the video mode 345 based upon the comparator output values and the horizontal timing parameters.

Reference is now made to FIGS. 2, 3, 4A–4B, 5A–5B, 6A–6B, and 8A–8D for describing the functionality of the present invention. Each video frame is defined as spanning from a falling edge to another falling edge of the Vsync signal from the graphics card 315 (FIG. 2). For example, falling edges 600 and 605 (FIG. 8A) define a video frame. The falling edge 600 occurs at time t1, while the falling edge 605 occurs at time t2. Alternatively, a video frame may be defined as spanning from a rising edge 610 to rising edge 615 of the Vsync signal.

Figure 8A:
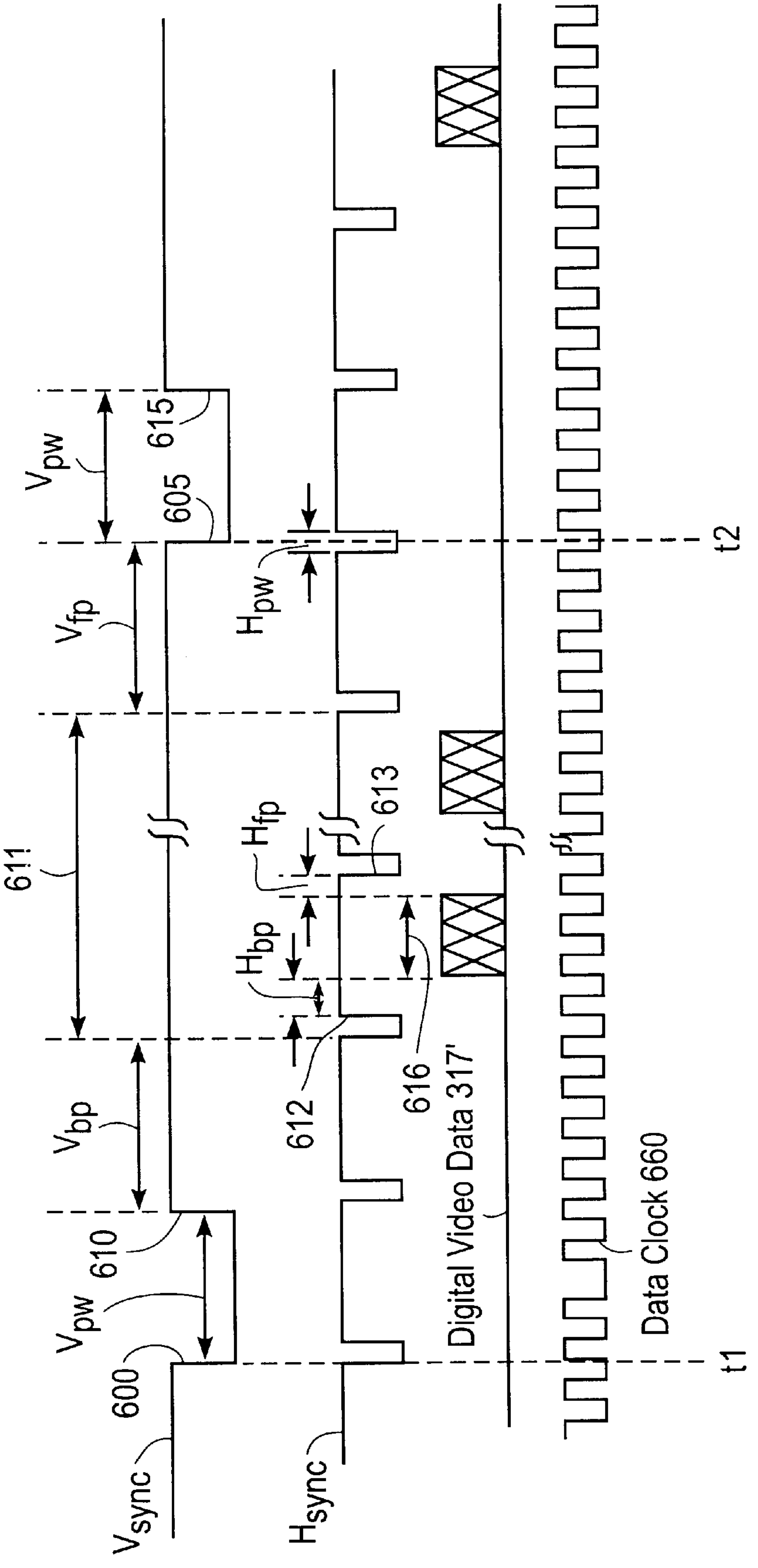
FIG. 8A is a timing diagram of the vertical synchronous signal Vsync, the horizontal synchronous signal Hsync, and a digitized video data signal that originated as an analog signal from the graphics card of FIG. 2.

With continuing reference to FIG. 8A, the pulse width Vpw of the Vsync signal is shown as, for example, the distance between edges 600 and 610. The vertical back-porch Vbp is the distance between a rising edge (e.g. edge 610) of a Vsync pulse and the vertical active video area 611. The vertical front-porch Vfp is the distance between a falling edge (e.g., edge 605) and the vertical active video area 611. The horizontal back-porch Hbp is the distance between a rising edge (e.g., edge 612) of the Hsync pulse and the horizontal active area 616. The horizontal front-porch Hfp is the distance between a falling edge (e.g., edge 613) of the Hsync pulse and the horizontal active area 616. The horizontal pulse width Hpw is the width of an Hsync pulse as shown in FIG. 8A. The above timing parameters (as well as the resolution value) determines the video mode 345 of a video signal.

The vertical timing parameters (including Vbp, Vfp, Vpw, and the vertical resolution) can be derived from signal A and signal B. The horizontal resolution can be derived from the vertical resolution. The horizontal timing parameters Hpw, Hbp, and Hfp can be derived by use of any suitable timing recovery circuit, such as the timing recovery circuit disclosed in the above-mentioned U.S. patent application Ser. No. 08/876,846 to Biao Zhang et al. Based on the values of the above timing parameters (including the vertical resolution and horizontal resolution), the logic circuit 340 (FIG. 2) can output the appropriate video mode 345 to the processing circuit 325.

The Hsync signal from the graphics card 315 (FIG. 2) controls the horizontal scan rate wherein the horizontal scan rate is number of lines (Hsync pulses) per second. The number of Hsync pulses within a frame indicates the total lines within a video frame. Although in FIG. 8A only several pulses are shown for the time interval t1 to t2, it is understood that additional pulses may occur in the Hsync signal in the time interval t1 to t2.

Figure 8B:
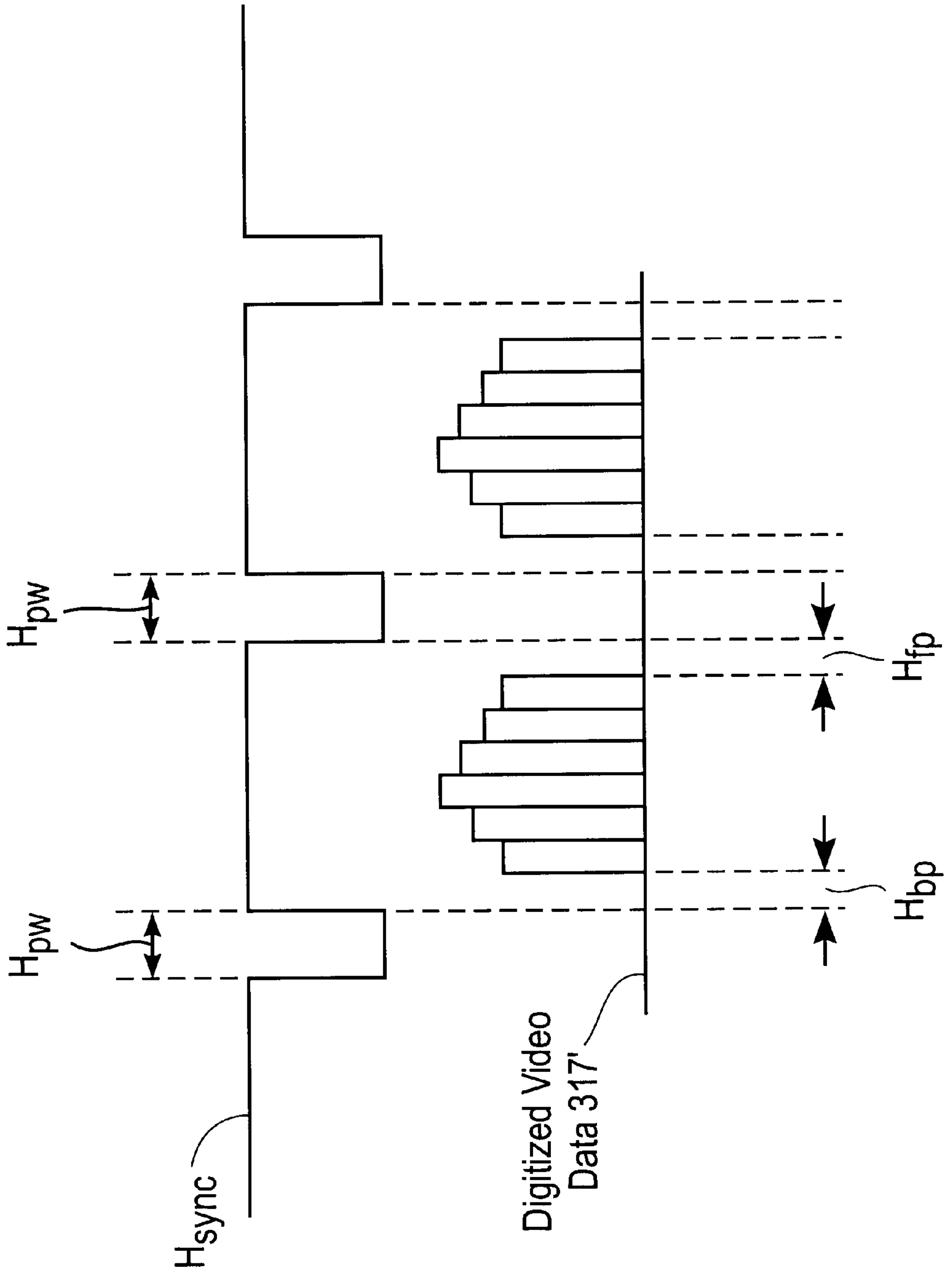
FIG. 8B is a timing diagram that illustrates the relative widths of the pulses of the Hsync signal and the digitized video data signal of FIG. 8A.

As further shown in FIG. 8B, a low pulse interval Hpw of the Hsync signal is relatively narrow, for example, about 1/100 of the period of the Hsync signal. As also shown in FIG. 8B, the digitized video data 317' has a plurality of bits. Additionally, the digitized video data 317' is offset by a time period Hbp with respect to a rising edge of an Hsync pulse. The digitized video data 317' is also offset by a time period Hfp with respect to a falling edge of an Hsync pulse.

Figure 8C:
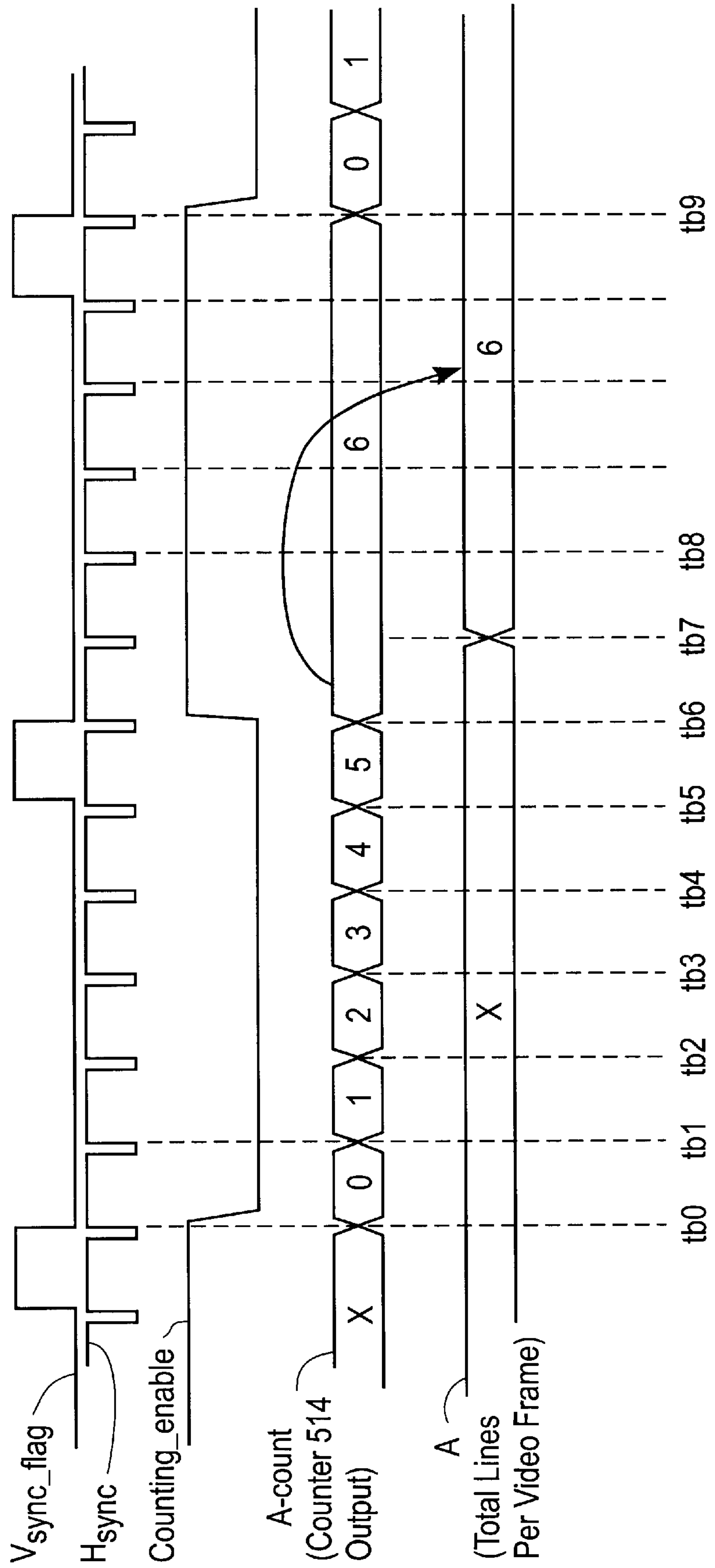
FIG. 8C is a timing diagram of the signals in the total line counter stage of FIG. 5B.

Reference is now made to the schematic circuit diagram of FIG. 5B and the timing diagram of FIG. 8C for the purpose of describing the operation of the total line counter stage 330. At initial time tb0, the Vsync_flag and counting_enable signals are high. As a result, the AND gate 509 outputs the reset signal at a high value, thereby switching the multiplexer 512 input to ground and thus resetting the flip-flop 514 value (A_count signal) to a zero value. At time tb1, the counting_enable signal switches low and is active. As a result, the output of the adder 516 is received by the multiplexer 510. Since the counting_enable signal is low, the AND gate 509 outputs the reset signal at a low value. Since the reset signal is low, the multiplexer 512 receives the output of the multiplexer 510. The flip-flop 514 output (value) will increment for each detected Hsync pulse (see time tb2–tb6 in FIG. 8C). Additionally, since the counting enable_signal is low during time tb1–tb6, the Q output of flip-flop 517 is fed back into an input of multiplexer 511.

At time tb7, the counting_enable signal has switched high and is not active. Therefore, the multiplexer 511 is switched to receive the A_count signal. At time tb8, the flip_flop 517 will output the received A_count value as the signal A (total lines per frame).

At time tb9, the Vsync_flag and counting_enable signals are again high. As a result, the AND gate 509 outputs the reset signal at a high value, thereby switching the multiplexer 512 input to ground and resetting the flip-flop 514 value (A_count signal) to zero. After time tb9, the counting_enable signal switches low, thereby permitting the accumulator 492 to again count the number of Hsync pulses that are detected.

Figure 8D:
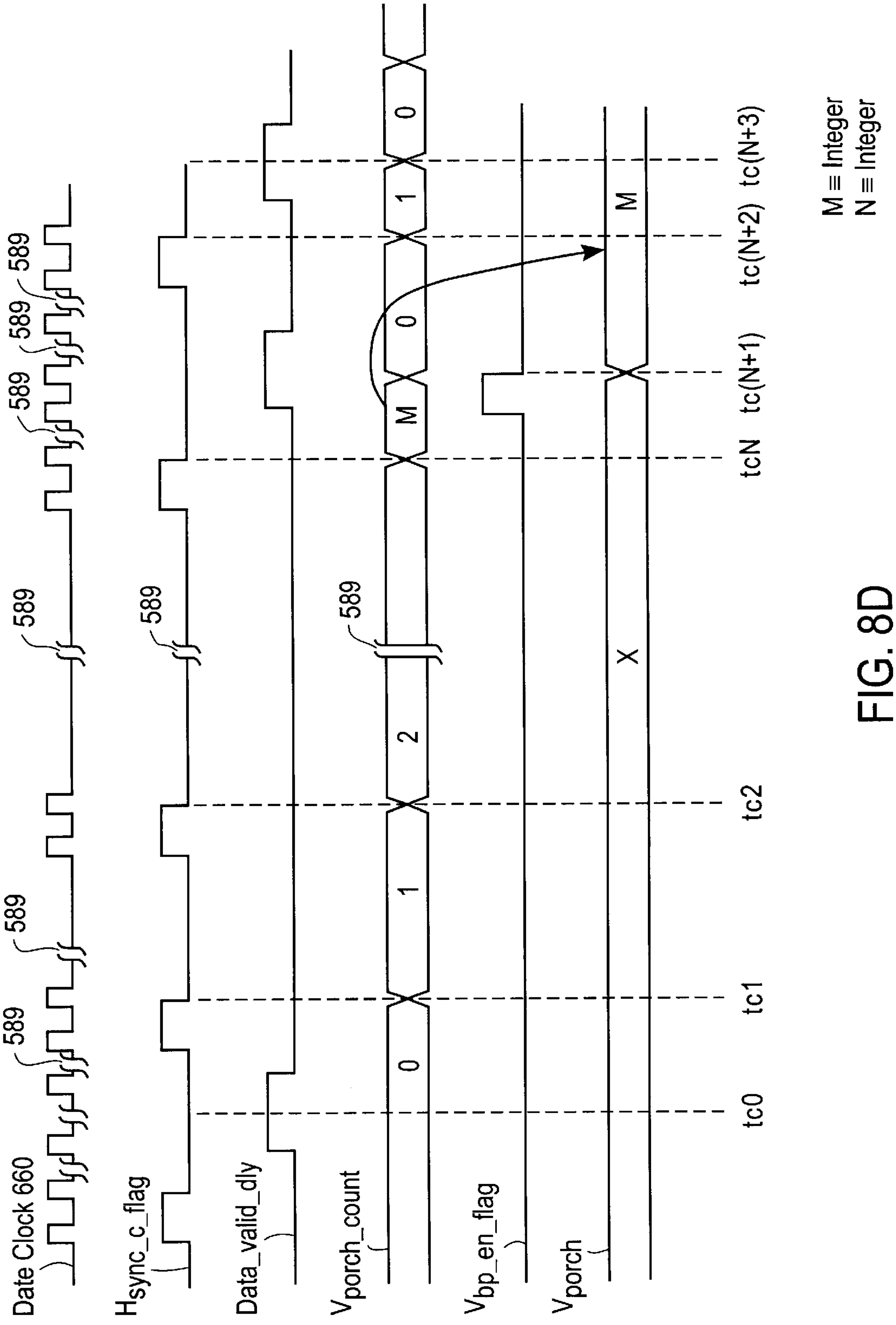
FIG. 8D is a timing diagram of the signals in the active line counter stage of FIG. 6B

Reference is now made to the schematic circuit diagram of FIG. 6B and the timing diagram of FIG. 8D for the purpose of describing the operation of the active line counter stage 335. It is understood that the discontinuities 589 in the waveforms in FIG. 8D symbolizes additional pulses that have been omitted in order to avoid overcrowding the drawings. At initial time tc0, the data_valid_dly signal from flip-flop 539 is high, thereby switching the multiplexer 538 input to ground and thus resetting the flip-flop 536 value (Vporch_count) to a zero value. When the data_valid_dly signal switches low, the multiplexer 538 passes the output of the multiplexer 537 to the D input of flip-flop 536.

The reset and counting enable controller 650 (FIG. 6B) generates the Hsync_c_flag signal (FIG. 8D) which is received by the multiplexer 537. If the Hsync_c_flag signal is low, then the multiplexer 537 passes the signal from the output of flip flop 536. When the Hsync_c_flag signal is high, the multiplexer 537 receives the adder 535 output. At time periods tc1, tc2, . . . tcN, the data_valid_dly signal is low, and the output of multiplexer 537 is transmitted through multiplexer 538 and output by flip flop 536 as the Vporch_count value. The Vporch_count value increments for each pulse occurrence of the Hsync_c_flag signal.

At time tc(N+1), the Vbp_en_flag signal from AND gate 533 goes high, and thus the Vporch_count signal (value M) from flip flop 536 is passed by multiplexer 534 to the flip flop 540. The flip flop 540 then outputs the Vporch signal (value M) which indicates the total blanking lines per frame. The subtractor 541 subtracts the Vporch signal from the total lines per frame (signal A) and thus generates the active lines per frame value (signal B).

It is understood that the data clock signal 660 (FIGS. 6B and 8D) is used to sample the analog video data 317. Additionally, the processing circuit 325 (FIG. 2) generates a panel (display) clock (not shown) for driving the flat panel display unit 310.

The comparator 460 (FIG. 4A) compares the values of the digitized video data 317' with a predetermined video data threshold value $V_T$ that is programmed in the threshold memory device 480. For example, the predetermined video data threshold value may be set at about 001000 in a 6-bit per color video system. However, it is understood based on the teachings of the present invention herein that the predetermined video data threshold value may be set at other levels.

Assume that the predetermined video data threshold value has been set at about 001000 in the threshold memory device 480. The comparator 460 compares the digitized video data signal 317' with the predetermined video data threshold value of 001000. The comparator 460 outputs an active line indicator signal 700 to active line counter stage 335 if the active video (active line) 705 is above the predetermined video data threshold value of 001000. Similarly, the comparator 460 outputs an active line indicator signal 700 if the active video 710 (or the active video 715) is above the threshold value of 001000. For each given video frame, the comparator 460 will detect each active video present in the digitized video data 317' and output an active line indicator signal 700 upon detection of an active video.

Figure 8E:
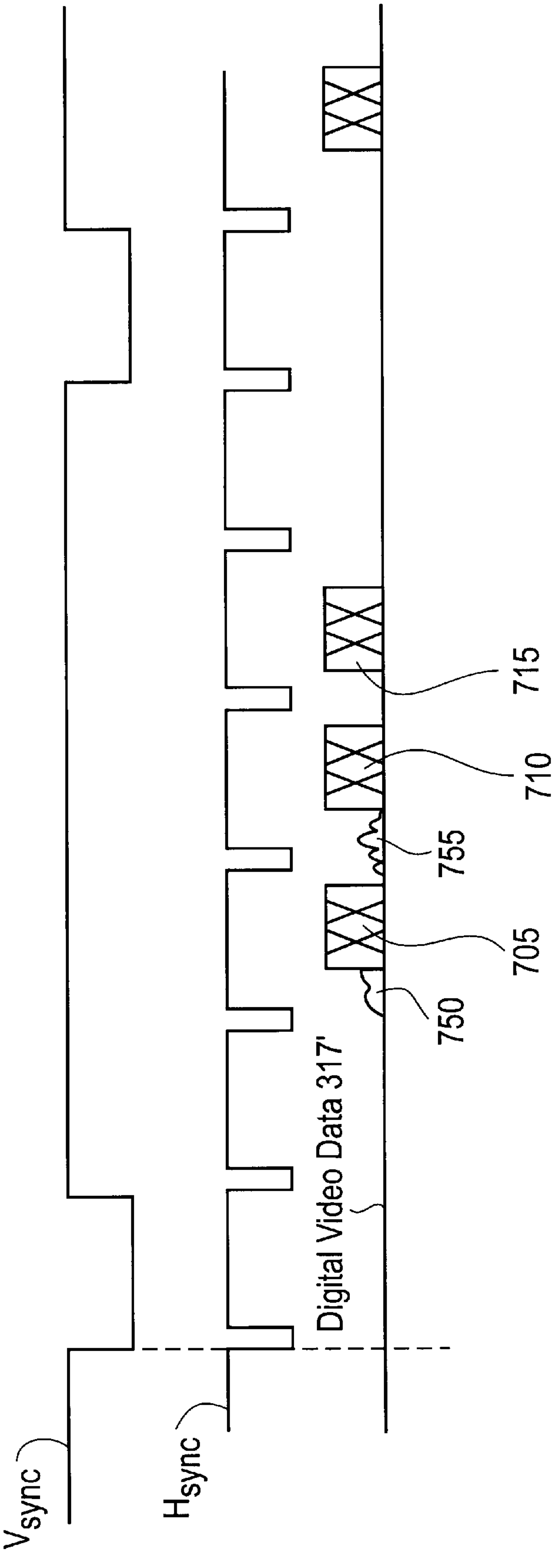
FIG. 8E is a timing diagram showing noise waveforms affecting the digitized video data signal of FIG. 8A.

By programming the video data threshold value $V_T$ in threshold memory device 480 at a particular level (e.g., 001000), filtering is performed if the digitized video data 317' contains noise waveforms so that an active line is differentiated from noise. For example, in FIG. 8E the digitized video data signal 317' contains noise waveforms 750 and 755 on the blanking intervals. The video data signal 317' may typically contain the noise waveforms 750 and 755 as the analog video data signal 317 propagates and is processed in the computer system. In particular, the ADC 470 may not always output a perfect "zero" digital value output during a blanking interval due to noise or imperfections in the hardware. By setting the video data threshold value at, for example, about 001000, the comparator 460 will read the noise waveforms 750 and/or 755 as blanking intervals. Thus, the comparator 460 will not erroneously output an active line indicator signal 700 upon detecting the noise waveforms 750 and/or 755. By appropriately setting the video data threshold value in the threshold memory device 480, the comparator 460 can properly differentiate an active video from a blanking interval if the digitized video data signal 317' contains noise waveforms.

The active line counter stage 335 also receives the Hsync signal from the graphics card 315 (FIG. 2). For each video frame, the active line counter stage 335 outputs a value indicating the active lines per frame (signal B) for input into the logic circuit 340. Based upon the signal A and signal B values and the mode detection threshold values stored in memory or register set 485, the logic circuit 340 can determine the video resolution of the video data 317.

Figure 9:
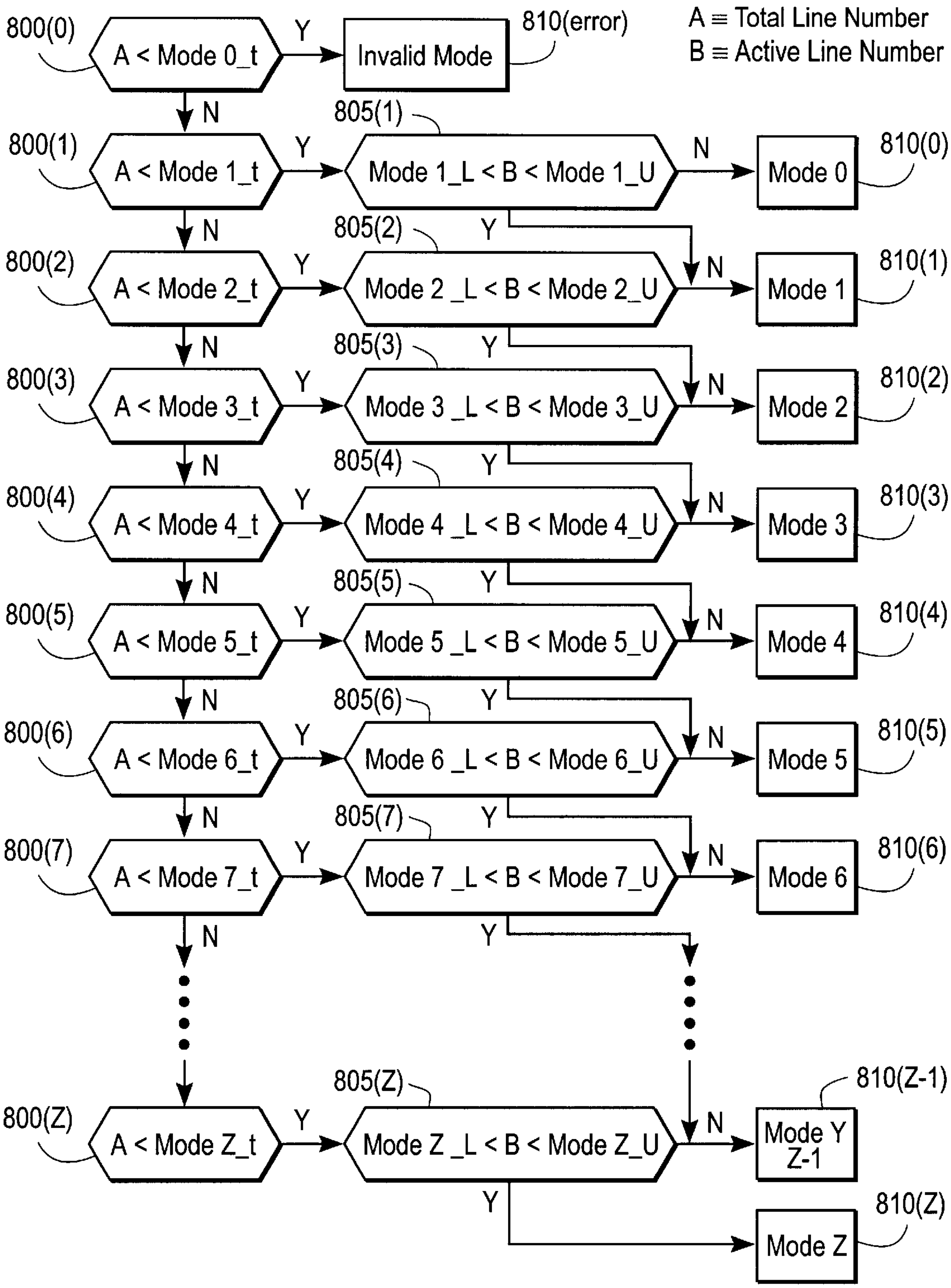
FIG. 9 is a flowchart illustrating a method of detecting the video mode of a video signal in accordance with a preferred embodiment of the present invention wherein a resolution of the video signal is determined based on the number of total lines per video frame and the number of active lines per video frame.

Referring now to FIG. 9, there is shown a flowchart that illustrates a method of detecting the video mode of a video data in accordance with a preferred embodiment of the present invention. As noted above, the total line threshold values Mode0_t . . . ModeZ_t and the active line threshold values Mode1_L/Mode1_U . . . ModeZ_L/ModeZ_U are programmable values. As stated above, Tables 5 and 6 list examples of programmable values that represents that total line threshold values and the active line threshold values, respectively, if the resolution values listed in Table 4 are to be supported. Other resolution values and active line and total line threshold values may be used for the method shown in FIG. 9.

Blocks 800(0), 800(1), 800(2), . . . 800(Z) determine if the signal A (total lines per video frame) is less than the total line threshold values Mode0_t, Mode1_t, Mode2_t, . . . ModeZ_t, respectively. For example, in block 800(0), the value of signal A is compared with the total line threshold value Mode0_t. If the value of signal A is less than Mode0_t, then the mode detection circuit in accordance with the present invention will output an invalid mode (block 810(error)).

If the value of signal A is not less than Mode0_t, then the value of signal A is compared to the total line threshold value Mode1_t (block 800(1)). If the value of signal A is not less than Mode1_t, then the value of signal A is compared with the total line threshold value Mode2_t (block 800(2)). On the other hand, if the value of signal A is greater than (or equal to) Mode0_t but is less than Mode1_t, then the method proceeds to block 805(1).

In block 805(1), the value of signal B (the active lines per video frame) is compared with the active line number threshold values Mode1_L and Mode1_U. If the value of signal B is less than Mode1_L, then the video mode detection circuit 320*a* (FIG. 2) will indicate the video mode of the video data 317 (FIG. 2) as Mode 0 (block 810(0)). On the other hand, if the value of signal B satisfies the condition Mode1_L<B<Mode1_U, then the video mode detection circuit 320 will indicate a video mode of Mode 1 (block 810(1)) for the video data 317.

Subsequent blocks in FIG. 9 also follow the above mentioned process for determining the video mode of the video data 317. For example, if the value of signal A is less than Mode3_t (block 800(3)) and is greater than (or equal to) Mode2_t (block 800(2)), then block 805(3) will determine if Mode3 L<B<Mode3_U. If B is less than Mode3_L, then the video data 317 has a video mode of Mode 2 (block 810(2)). On the other hand, if the value of signal B satisfies the condition Mode3_L<B<Mode3_U, then the video mode detection circuit 320*a* (FIG. 2) outputs a video mode of Mode 3 (block 810(3)).

In an alternative embodiment, the method according to the present invention compares the value of signal A concurrently in the blocks 800(0), 800(1), . . . 800(Z). For example, blocks 800(0), 800(1) and 800(2) may concurrently perform the comparison of the value of signal A. Assuming that A<Mode2_t and A>Mode1_t, Block 805(2) will then determine if Mode2_L<B<Mode2_U. Based upon the determination of the value of signal B in Block 805(2), the video mode of the video data 317 is either Mode 1 (block 810(1)) or Mode 2 (block 810(2)).

It is understood based on the teachings of the present invention herein that the signal A may be compared up to a Z number of total line threshold values wherein Z is an integer (see block 800(Z)).

In an alternative embodiment (not shown), the signal A may be compared to only two (2) total line threshold values. For example, the value of signal A may be compared to Mode0_t and Mode1_t. In this particular implementation, the video mode detection circuit 320*a* can determine if the video data 317 has a video mode of Mode 0 (block 810(0)) or Mode 1 (block 810(1)), or if the video mode detection circuit 320*a* will output an invalid mode (block 810(error)).

Thus, the circuit and method discussed above permit the automatic detection of the video modes of different graphics card in a computer unit. The range and number of video modes that may be detected by the present invention is variable.

The circuit and method discussed above can also accurately distinguish the video resolution of various graphics cards with the same number or a substantially close number of total lines per frame. For example, for a video resolution of 640×350, signal A may have any of the following total-lines-per-frame values as shown in Table 7, depending on the graphics card design.

TABLE 7

| (640 × 350 resolution) |
|---|
| A = 380 total lines per frame |
| A = 410 total lines per frame |
| A = 420 total lines per frame |

For a video resolution of 720×400, signal A may, for example, have any of the following total-line-per-frame values as shown in Table 8, depending on the graphics card design.

TABLE 8

| (720 × 400 resolution) |
|---|
| A = 410 total lines per frame |
| A = 420 total lines per frame |
| A = 430 total lines per frame |

Now assume that the above method detects the value of signal A as equal to about 420 total lines per frame. Since the signal A has a value of A=420 total lines, the resolution is either 640×350 or 720×400, as shown in Tables 7 and 8.

The present invention solves potential problems in the accurate detection of resolution values for resolution values that have the same amount or a substantially the same amount of total lines per frame. The present invention detects the value of signal B to distinguish two resolution values that have the same amount or a substantially the same amount of total lines per frame. Continuing with the example above wherein the signal A is equal to 420 total lines per frame, if the value of signal B is detected as equal to about 400 total lines per frame, then a resolution of 720×400 is concluded based on the following. As shown in the example in Table 6, if B=400, then the condition, Mode1__L<B<Mode1__U, is satisfied wherein Mode1__L=398 and Mode1__U=402. As shown in block 805(1) (FIG. 9), the satisfaction of the above condition will indicate a Mode 1 (720×400 in Table 4) for the video data. Otherwise, the video data will have a Mode 0 (640×350) value.

Additionally, based on the above approach, the present invention overcomes the prior art problem of video mode detection in the case when a first video mode has a greater number of total lines than a second video mode, but the first video mode has a lesser number of active lines than the second video mode.

The present invention also advantageously permits the automatic detection of the video mode of a signal so that the number of the pixels is properly set in a flat panel display unit. Since the present invention enables the automatic detection of video mode values of different graphics cards, the invention allows any particular flat panel display unit to function with any one of various computer units having graphics cards with different video modes. Thus, the end user will be able to integrate a particular flat panel display unit with any one of various computer units with less difficulty. The end user will also be able to integrate various flat panel display units with a particular computer unit.

Figure 10:
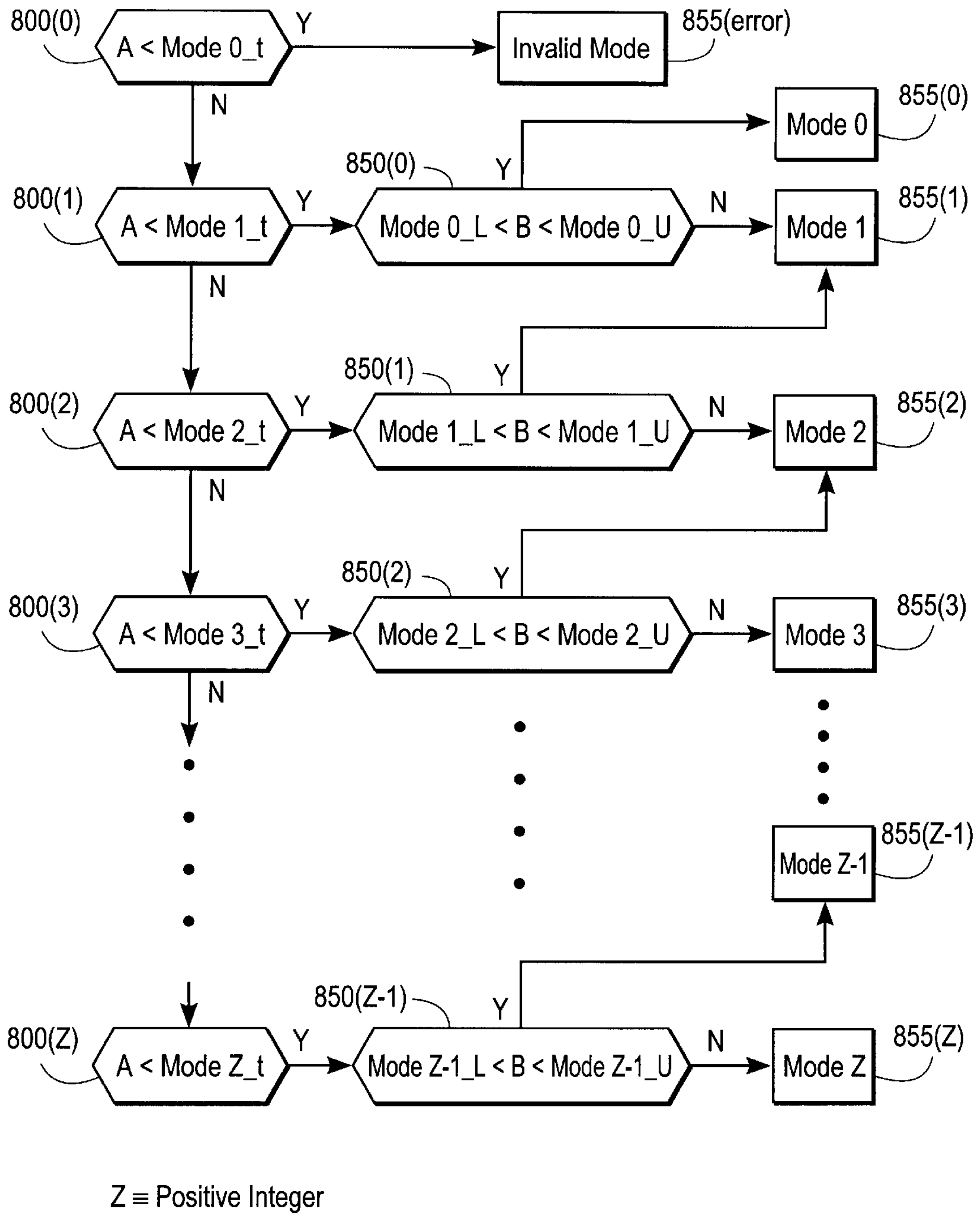
FIG. 10 is a flowchart illustrating a method of detecting the video mode of a video signal in accordance with another embodiment of the present invention.

Referring now to FIG. 10, there is shown a flowchart that illustrates a method of detecting the video mode of a video data in accordance with another embodiment of the present invention. In block 800(0), if the value of signal A is less than Mode0__t, then an invalid mode (block 855(error)) is indicated by the video mode detection circuit 320*a*. In block 800(1), if the value of signal A is less than Mode1__t, then the method proceeds to block 850(0). Otherwise, the method proceeds to block 800(2) during which it is determined if A<Mode2__t.

In block 850(0), it is determined if the condition, Mode0__L<B<Mode0__U, is satisfied. If the above condition is satisfied, then the mode detection circuit 320*a* will indicate a video mode of Mode 0 (block 855(0)). Otherwise, a video mode of Mode 1 (block 855(1)) is indicated.

As another example, if it is determined in block 800(2) that the condition, A<Mode2__t is satisfied, then the method proceeds to block 850(1). In block 850(1), it is determined if the condition, Mode1__L<B<Mode1__U, is satisfied. If the above condition is satisfied, then the mode detection circuit 320*a* will indicate a video mode of Mode 1 (block 855(1)). Otherwise, a video mode of Mode 2 (block 855(2)) is indicated.

Figure 11:
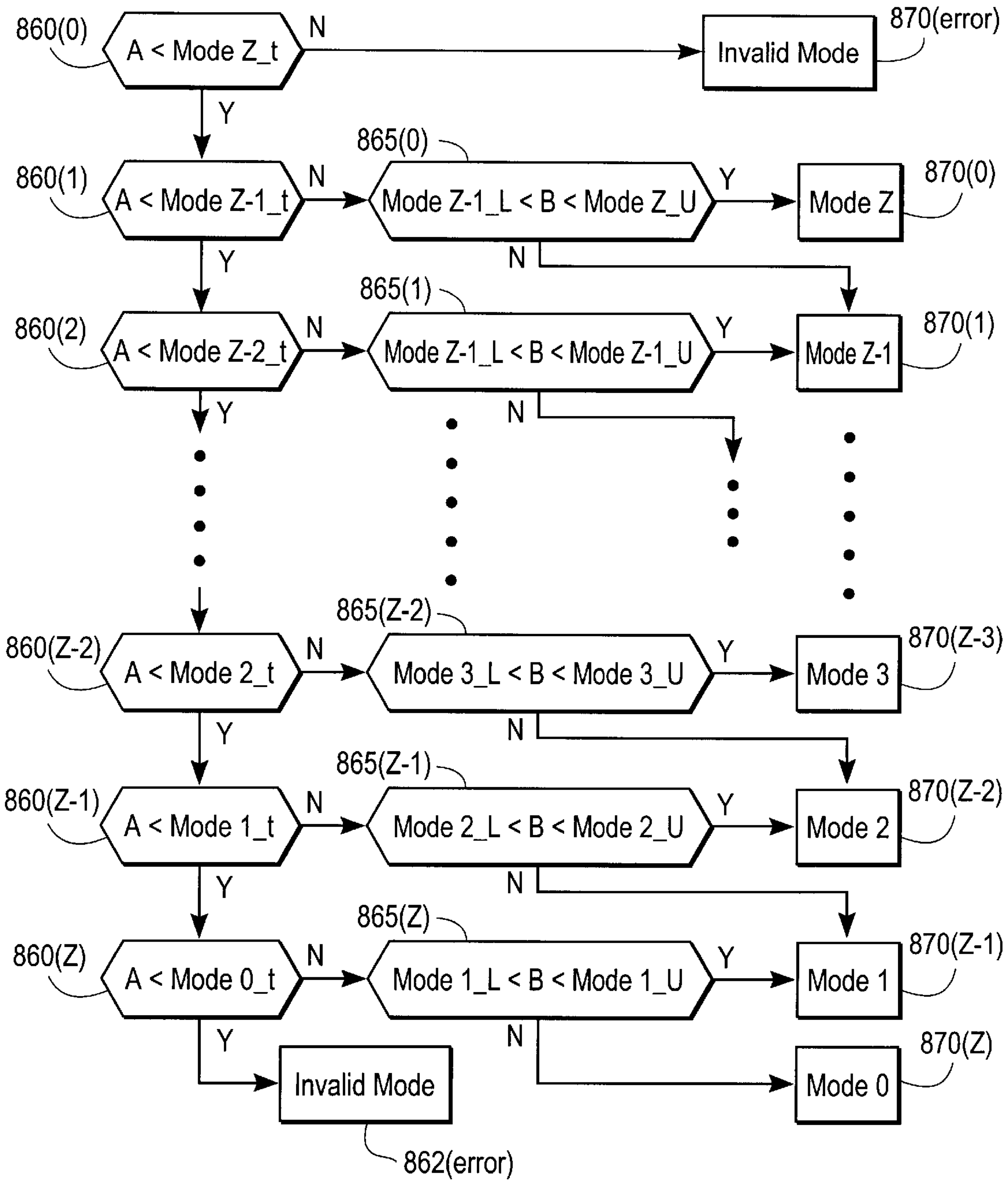
FIG. 11 is a flowchart illustrating a method of detecting the video mode of a video signal in accordance with another embodiment of the present invention.

Referring now to FIG. 11, there is shown a flowchart that illustrates a method of detecting the video mode of a video data in accordance with another embodiment of the present invention. In block 860(0), if the value of signal A is not less than ModeZ__t wherein Z is a positive integer, then an invalid mode (block 870(error)) is indicated by the video mode detection circuit 320*a*. Otherwise, it is determined in block 860(1) if A is less than ModeZ-1__t.

In block 860(1), if the value of signal A is less than ModeZ-1__t, then the method proceeds to block 860(2) wherein the condition A<ModeZ-2__t is determined. If, however, in block 860(1) the condition A<ModeZ-1__t is not satisfied, then the method proceeds to block 865(0).

In block 865(0), it is determined if the condition, ModeZ__L<B<ModeZ__U, is satisfied. If the above condition is satisfied, then the mode detection circuit 320*a* will indicate a video mode of Mode Z (block 870(0)). Otherwise, a video mode of Mode Z-1 (block 870(1)) is indicated.

As a further example, assume that it is determined that A<Mode0__t (block 860(Z)). As a result, an invalid mode (block 862(error)) will be indicated by the mode detection circuit 320*a*.

As another example, assume that signal A satisfies the following conditions: A<Mode1__t and A>Mode0__t. As a result, it is determined in block 865(Z) if the condition, Mode1__L<B<Mode1__U, is satisfied. If the above condition is satisfied, then the video mode detection circuit 320*a* will indicate Mode 1 (block 870(Z-1)). If the condition is not satisfied, then Mode 0 (block 870(Z)) will be indicated.

The method in FIG. 11 will compare the value of signal A with various total line threshold values (e.g., ModeZ__t, ModeZ-1__t, . . . Mode1__t, Mode0__t) until it is determined that A falls within a specified total line threshold value range, as shown in the examples above. In addition, subsequent blocks in FIG. 11 also follow the above mentioned process for determining the video mode of a video signal.

Figure 12:
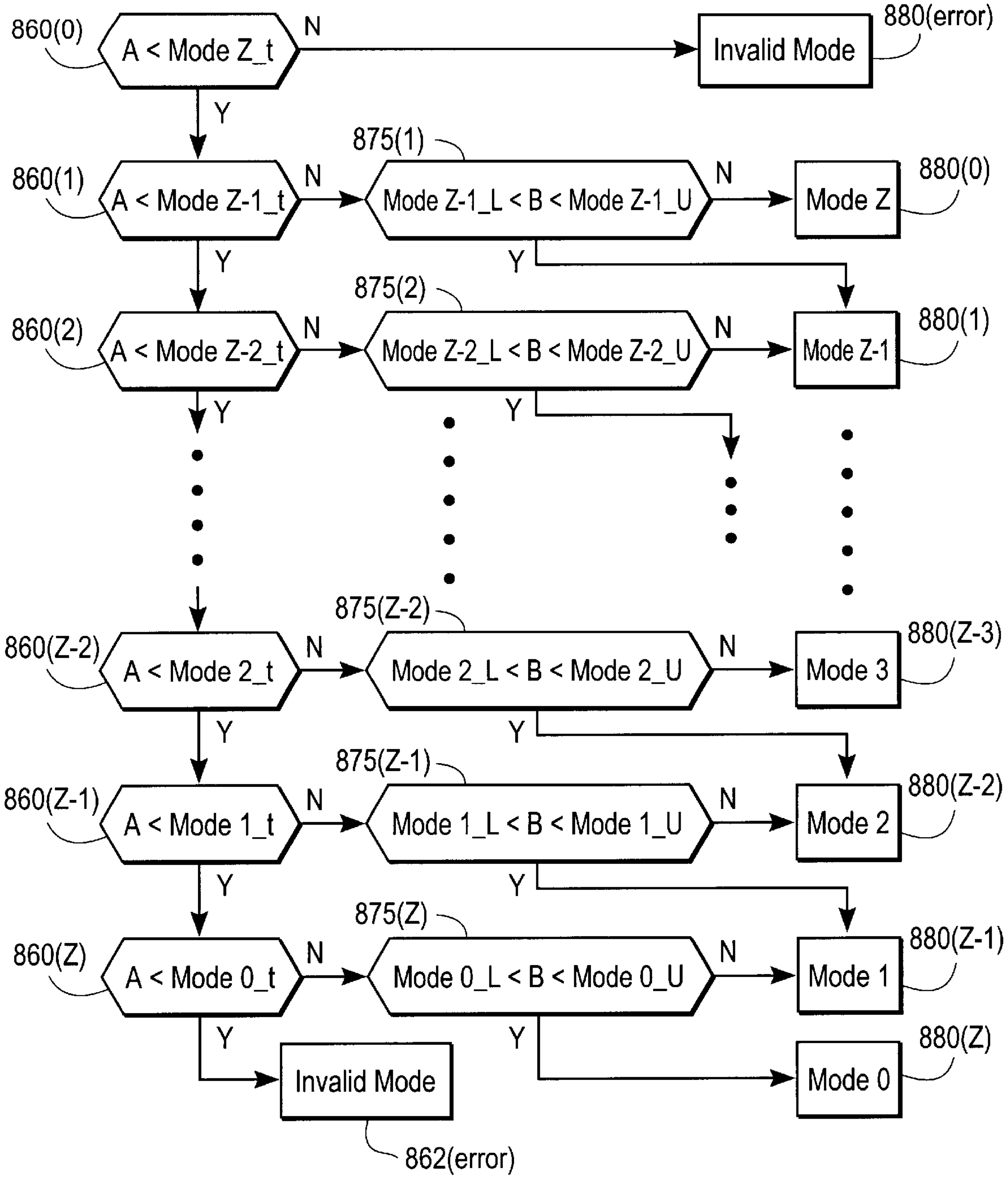
FIG. 12 is a flowchart illustrating a method of detecting the video mode of a video signal in accordance with another embodiment of the present invention.

Referring now to FIG. 12, there is shown a flowchart that illustrates a method of detecting the video mode of a video data in accordance with another embodiment of the present invention. In block 860(0), if the value of signal A is not less than ModeZ__t wherein Z is a positive integer, then an invalid mode (block 880(error)) is indicated by the video mode detection circuit 320*a*. Otherwise, it is determined in block 860(1) if A is less than ModeZ-1__t.

In block 860(1), if the value of signal A is less than ModeZ-1__t, then the method proceeds to block 860(2) wherein the condition A<ModeZ-2__t is determined. If, however, in block 860(1) the condition A<ModeZ-1__t is not satisfied, then the method proceeds to block 875(1).

In block 875(1), it is determined if the condition, ModeZ-1__L<B<ModeZ-1__U, is satisfied. If the above condition is not satisfied, then the mode detection circuit 320*a* will indicate a video mode of Mode Z (block 880(0)). Otherwise, a video mode of Mode Z-1 (block 880(1)) is indicated. Subsequent blocks in FIG. 12 also follow the above mentioned process for determining the video mode of a video signal.

Figure 13:
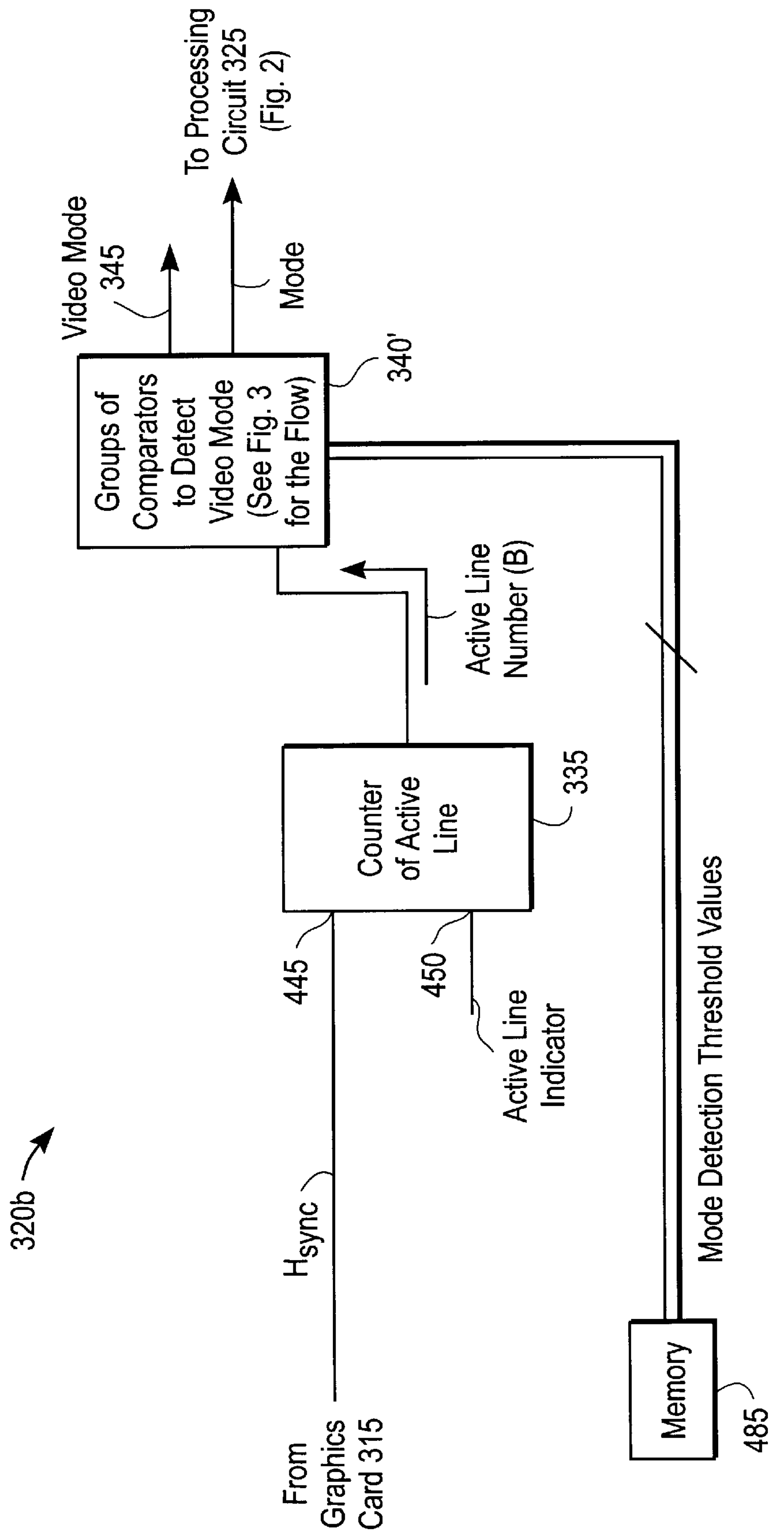
FIG. 13 is a functional block diagram of a video mode detection circuit in accordance with a second embodiment of the present invention wherein the resolution of a video signal is determined based upon the number of active lines per video frame.

FIG. 13 is a functional block diagram of a second embodiment of a video mode detection circuit 320*b* in accordance with the present invention. The video mode detection circuit 320*b* determines the video mode of a video data signal 317 based upon the number of active lines per frame. The video mode detection circuit 320*b* also includes a logic circuit 340' that receives the signal B and that generates the video mode signal 345 in response to the value of signal B and the programmed video mode detection threshold values from memory or register set 485.

Figure 14:
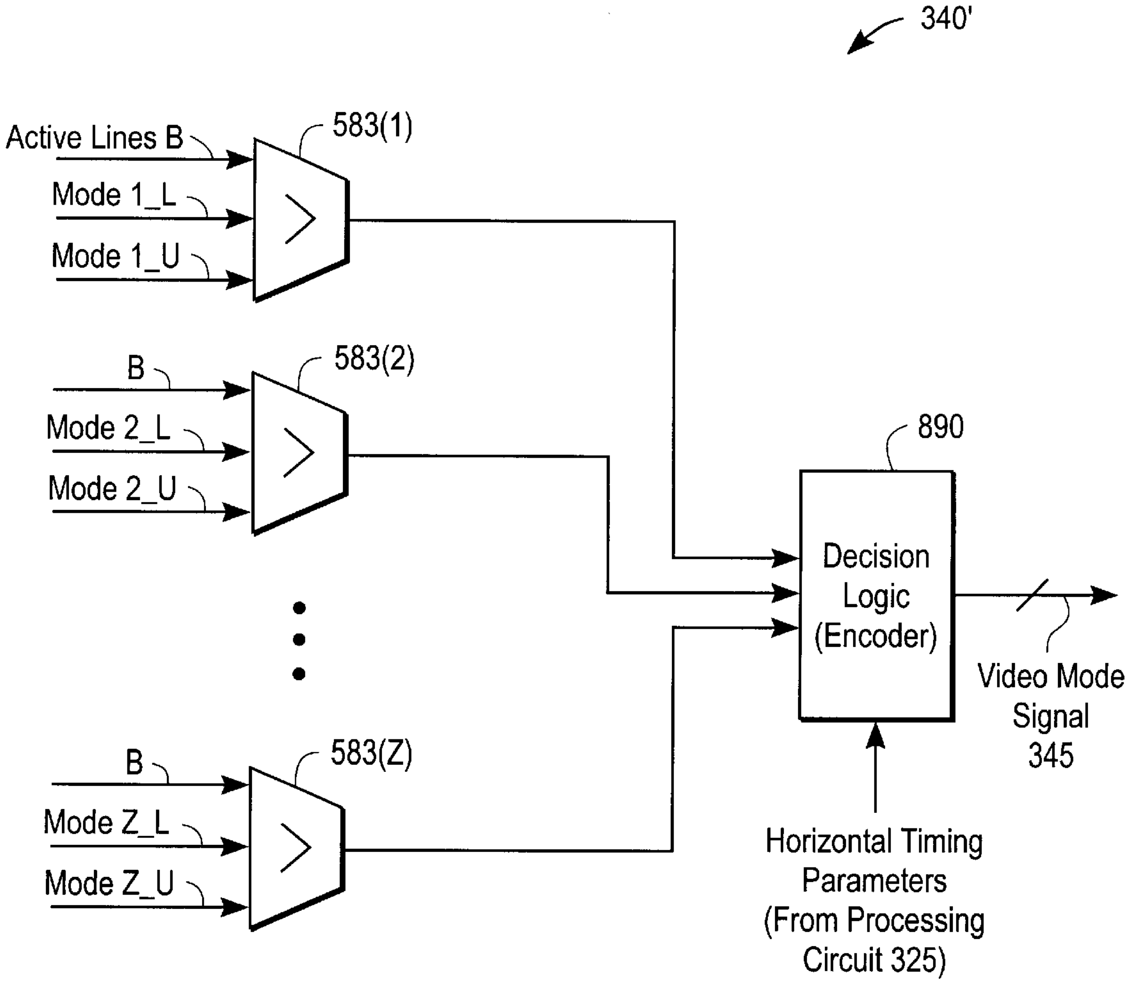
FIG. 14 is a functional block diagram of one embodiment of the logic circuit of FIG. 13.

FIG. 14 shows a functional block diagram of an example of the logic circuit 340' in FIG. 13. The logic circuit 340' includes comparators 583(1), 583(2), . . . 583(Z) for comparing the value of signal B with respect to the active line threshold values Mode1__L/Mode1__U, Mode2__L/Mode2__U, . . . ModeZ__L/ModeZ__U, respectively. The decision logic (encoder) 890 receives the outputs of the comparators 583(1), 583(2), . . . 583(Z) outputs the video mode 345 based upon the comparator output values and the horizontal timing parameters from processing circuit 325 (FIG. 2). Other embodiments of the logic circuit 340' may implemented, based upon the teachings of the present invention herein.

Figure 15:
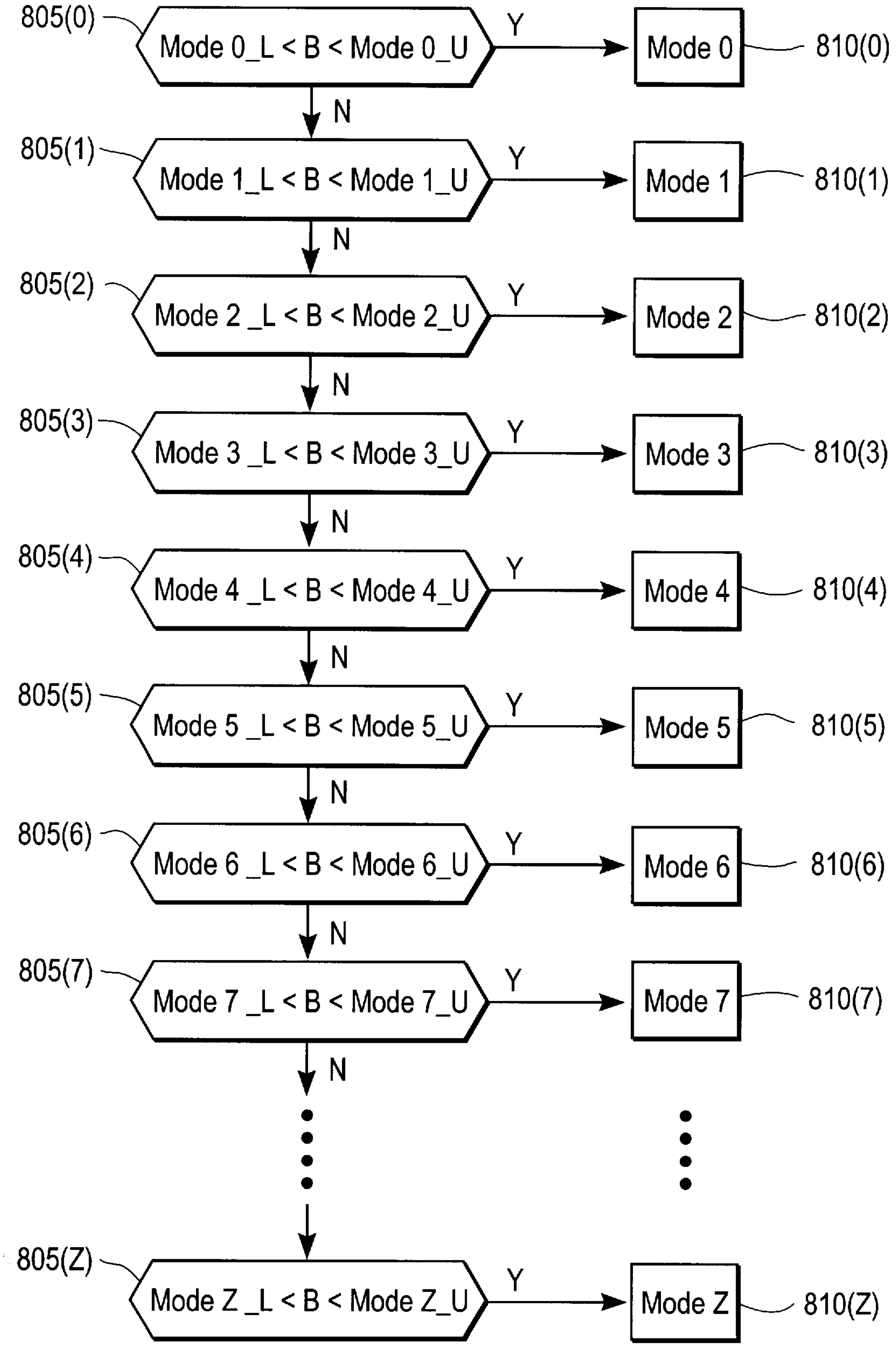
FIG. 15 is a flowchart illustrating a method of detecting the video mode of a video signal in accordance with another embodiment of the present invention wherein the resolution of the video signal is determined based upon the number of active lines per video frame.

Referring now to FIG. 15, there is seen a method of detecting the video mode of a video signal in accordance with the second embodiment of the present invention. Blocks 805(0), 805(1), . . . 805(Z) determine if the signal B is within a particular range of active line threshold values. For example, in block 805(1), the following condition is determined: Mode1___L<B<Mode1__U. If the above condition is satisfied, then the video mode detection circuit 320*b* (FIG. 13) will indicate the video mode as Mode 1 (block 810(1)).

If the above condition is not satisfied, then block 805(2) will determine if the following condition exists: Mode2__L<B<Mode2__U. If the above condition is satisfied, then the video mode detection circuit 320*b* will indicate the video mode as Mode 2 (block 810(2)). On the other hand, if the condition, Mode2__L<B<Mode2__U, is not satisfied, then block 805(3) will determined if the following condition exists: Mode3__L<B<Mode3__U. Subsequent blocks 805(4), 805(5), . . . 805(Z) follow the above mentioned process for determining the video mode of the video data 317.

In another alternative embodiment, the blocks 805(0, 805(1, . . . 805(Z) concurrently compares the value of signal B with the active line threshold values Mode0__L/Mode0__U . . . ModeZ__L/ModeZ__U. For example, blocks 805(0), blocks 805(1), 805(2), and 805(3) may concurrently perform the comparison of the value of signal B. Assuming that the condition Mode2__L<B<Mode2__U exists, the video mode detector circuit 320*b* (FIG. 13 will then indicate a video mode of Mode 2 (block 810(2)).

While the present invention has been described with reference to certain preferred embodiments, those skilled in the art will recognize that various modifications may be provided. For example, while the video mode detection circuit in accordance with the present invention has been described as being implemented in a personal desktop computer system, the above video mode detection circuit may also be implemented in other types of computer systems such as workstations and portable computer systems. In addition, the above video mode detection circuit is capable of operating with other types of flat panel display units such as gas-plasma display units and electroluminescent display units. These and other variations upon and modifications to the preferred embodiments are provided for by the present invention which is limited only by the following claims.

What is claimed is:

1. An apparatus for detecting the video mode of a video data, the apparatus capable of receiving a plurality of synchronous signals along with the transmission of the video data, the apparatus comprising:

a first counter stage capable of receiving the synchronous signals and generating a first counter stage output signal that represents the number of lines in a frame of the video data;

a second counter stage capable of receiving an active line indicator signal that indicates an active line in the video data, the second counter stage capable of generating a second counter stage output signal that represents the number of active lines in a frame of the video data; and a logic circuit coupled to the first counter stage and to the second counter stage, the logic circuit capable of detecting the video mode of the video data based upon the values of the first counter stage output signal and the second counter stage output signal.

2. The apparatus of claim 1 further comprising:

a comparator coupled to the second counter stage and capable of receiving the video data and a video data threshold signal, the comparator capable of producing the active line indicator signal for input into the second counter stage if the level of the video data is at least at the level of the video data threshold signal.

3. The apparatus of claim 2 wherein the video data threshold signal can be programmed.

4. The apparatus of claim 2 further comprising a storage device for providing the video data threshold signal.

5. The apparatus of claim 4 wherein the storage device for providing the video data threshold signal is a register.

6. The apparatus of claim 2 wherein the video data threshold signal is provided by a voltage supply source.

7. The apparatus of claim 1 wherein the logic circuit determines the video mode of the video data by comparing the values of the first counter stage output signal and the second counter stage output signal with a plurality of video mode detection threshold values.

8. The apparatus of claim 7 further comprising:

a second storage device coupled to the logic circuit and capable of providing the video mode detection threshold values to the logic circuit.

9. The apparatus of claim 8 wherein the second storage device comprises at least one register.

10. The apparatus of claim 7 wherein the video mode detection threshold values can be programmed.

11. The apparatus of claim 7 wherein the video mode detection threshold values include a plurality of total line threshold values and a plurality of active line threshold values.

12. The apparatus of claim 1 wherein the logic circuit comprises:

a plurality of comparators for sequentially comparing the number of total lines and the number of active lines in a frame of the video data to a plurality of video mode threshold values.

13. The apparatus of claim 1 wherein the logic circuit comprises:

a plurality of comparators for concurrently comparing the number of total lines and the number of active lines in a frame of the video data to a plurality of video mode threshold values.

14. An apparatus for detecting the video mode of a video data, comprising:

a total line counter stage for receiving a plurality of synchronization signals that are used in the transmission of video data, the total line counter stage configured to produce a total line counter stage output signal based upon the synchronization signals, the total line counter stage output signal representing the number of lines in a frame of the video data;

an active line counter stage for receiving an active line indicator signal that represents an active video in the video data, the active line counter stage configured to produce an active line counter stage output signal based upon the active line indicator signal, the active line counter stage output signal representing the number of active video lines in a frame of the video data; and a logic circuit coupled to the total line counter stage and to the active line counter stage, the logic circuit configured to indicate the video mode of the video signal in response to the total line counter stage output signal and the active line counter stage output signal.

15. The apparatus of claim 14 further comprising:

a comparator coupled to the active line counter stage and capable of receiving the video data and a video data threshold signal, the comparator generating an active line indicator signal if the level of the video data is at least at the level of the video data threshold signal.

16. The apparatus of claim 14 wherein the logic circuit determines the video mode of the video data based on a comparison of the values of the total line counter stage output signal and the active line counter stage output signal with a plurality of video mode detection threshold values.

17. The apparatus of claim 14 wherein the logic circuit comprises:

a plurality of comparators for sequentially comparing the total line counter stage output signal and the active line counter stage output signal to a plurality of video mode threshold values.

18. The apparatus of claim 14 wherein the logic circuit comprises:

a plurality of comparators for concurrently comparing the total line counter stage output signal and the active line counter stage output signal to a plurality of video mode threshold values.

19. The apparatus of claim 14 wherein the total line counter stage comprises:

a counter for counting the number of lines in a frame of video data;

a controller for generating a reset signal to reset the counter to an initial value, and for generating a counting enable signal that permits the counter to begin the count of the number of lines in a frame of video data; and a total line output logic, coupled to the counter, for buffering an output of the counter.

20. The apparatus of claim 14 wherein the active line counter stage comprises:

a blanking line counter for counting blanking periods in a frame of the video data; and a counting enable controller for generating an output signal that permits the blanking line counter to begin the count of the blanking periods in a frame of the video data.

21. The apparatus of claim 20 wherein the active line counter stage further comprises:

an active line output logic, coupled to the blanking line counter, for buffering an output of the blanking line counter;

a loading enable controller for controlling the active line output logic; and a subtractor for subtracting the number of blanking lines per video frame from the number of total lines per video frame and for generating an output representing the number of active lines per video frame.

22. A computer system which incorporates a flat panel display unit, comprising:

a flat panel display unit;

a computer unit for controlling the flat panel display unit, the computer unit including a video data source for producing video data, a video mode detection circuit for detecting the video mode of the video data based upon the total lines and the active lines per video frame, and a processing circuit coupled to the video mode detection circuit and capable of controlling the flat panel display unit, the video mode detection circuit further configured to differentiate an active line in the video data from a blanking period in the video data;

wherein the video mode detection circuit comprises:

a first counter stage capable of receiving synchronous signals transmitted with the video data and capable of generating a first counter stage output signal that represents the number of lines in a frame of the video data;

a second counter stage capable of receiving an active line indicator signal that indicates an active line in the video data, the second counter stage capable of generating a second counter stage output signal that represents the number of active lines in a frame of the video data; and a logic circuit coupled to the first counter stage and to the second counter stage, the logic circuit capable of detecting the video mode of the video data based upon the values of the first counter stage output signal and the second counter stage output signal.

23. The computer system of claim 22 further comprising:

a comparator coupled to the second counter stage and capable of receiving the video data and a video data threshold signal, the comparator capable of producing the active line indicator signal for input into the second counter stage if the level of the video data is at least at the level of the video data threshold signal.

24. The computer system of claim 23 wherein the video data threshold signal can be programmed.

25. The computer system of claim 24 further comprising a storage device for providing the video data threshold signal.

26. The computer system of claim 22 wherein the logic circuit determines the video mode of the video data by comparing the values of the first counter stage output signal and the second counter stage output signal with a plurality of video mode detection threshold values.

27. The computer system of claim 26 further comprising:

a second storage device coupled to the logic circuit and capable of providing the video mode detection threshold values to the logic circuit.

28. The computer system of claim 27 wherein the second storage device comprises at least one register.

29. The computer system of claim 26 wherein the video mode detection threshold values can be programmed.

30. The computer system of claim 29 wherein the video mode detection threshold values include a plurality of total line threshold values and a plurality of active line threshold values.

31. The computer system of claim 22 wherein the logic circuit comprises:

a plurality of comparators for sequentially comparing the first counter stage output signal and a second counter stage output signal to a plurality of video mode threshold values.

32. The computer system of claim 22 wherein the logic circuit comprises:

a plurality of comparators for concurrently comparing the first counter stage output signal and a second counter stage output signal to a plurality of video mode threshold values.

33. An apparatus for detecting the video mode of a video signal comprising:

an active line counter stage capable of receiving an active line indicator signal that indicates an active line in the video data, the active line counter stage capable of generating an active line counter stage output signal that represents the number of active lines in a frame of the video data;

an active line indicator signal generator coupled to the active line counter stage and configured to generate the active line indicator signal, the active line indicator signal generator generating the active line indicator signal by differentiating an active line in the video data from a blanking period in the video data; and a logic circuit coupled to the active line counter stage and capable of detecting the video mode of the video data based upon the value of the active line counter stage output signal.

34. The apparatus of claim 33 further comprising:

a comparator coupled to the active line counter stage and capable of receiving the video data and a video data threshold signal, the comparator capable of producing the active line indicator signal for input into the active line counter stage if the level of the video data is at least at the level of the video data threshold signal.

35. The apparatus of claim 34 wherein the video data threshold signal can be programmed.

36. The apparatus of claim 33 further comprising a storage device for providing a video data threshold signal.

37. The apparatus of claim 36 wherein the storage device for providing the video data threshold signal is a register.

38. The apparatus of claim 37 wherein the video data threshold signal is provided by a voltage supply source.

39. The apparatus of claim 36 wherein the logic circuit determines the video mode of the video data by comparing the value of the active line counter stage output signal with a plurality of video mode detection threshold values.

40. The apparatus of claim 39 further comprising:

a second storage device coupled to the logic circuit and capable of providing the video mode detection threshold values to the logic circuit.

41. The apparatus of claim 40 wherein the second storage device comprises at least one register.

42. The apparatus of claim 39 wherein the video mode detection threshold values can be programmed.

43. The apparatus of claim 39 wherein the video mode detection threshold values include a plurality of active line threshold values.

44. The apparatus of claim 33 wherein the logic circuit comprises:

a plurality of comparators for sequentially comparing the active line counter stage output signal to a plurality of video mode threshold values.

45. The apparatus of claim 33 wherein the logic circuit comprises:

a plurality of comparators for concurrently comparing the active line counter stage output signal to a plurality of video mode threshold values.

46. The apparatus of claim 33 wherein the active line counter stage comprises:

a blanking line counter for counting blanking periods in a frame of the video data;

a counting enable controller for generating an output signal that permits the blanking line counter to begin the count of the blanking periods in a frame of the video data;

an active line output logic, coupled to the blanking line counter, for buffering an output of the blanking line counter.

47. The apparatus of claim 46 further comprising:

a loading enable controller for controlling the active line output logic; and a subtractor for subtracting the number of blanking lines per video frame from the number of total lines per video frame and for generating an output representing the number of active lines per video frame.

48. The apparatus of claim 47 wherein the active line counter stage receives synchronization signals transmitted along with the video data.

49. A method of determining the resolution of a video data, the video data being transmitted by use of a plurality of synchronous signals the method comprising:

generating, in response to the synchronous signals, a first output signal that represents the number of lines in a frame of the video data;

generating a second output signal that represents the number of active lines in a frame of the video data; and generating a resolution signal that represents the resolution of the video data based upon the first output signal and the second output signal.

50. The method of claim 49 further comprising the step of:

generating a mode change flag signal to be received by a central processing unit to permit accurate detection of active lines in a frame of the video data.

51. The method of claim 49 wherein the step of generating the resolution signal further comprises the steps of:

comparing the value of the first output signal with a plurality of total line threshold values; and comparing the value of the second output signal with a plurality of active line threshold values.

52. An apparatus for determining the resolution of a video data, the video data being transmitted by use of a plurality of synchronous signals, the apparatus comprising:

means for generating a first output signal that represents the number of total lines in a frame of the video data, the means for generating the first output signal responsive to the synchronous signals;

means for generating a second output signal that represents the number of active lines in a frame of the video data; and means for generating a resolution signal that represents the resolution of the video data based upon the first output signal and the second output signal, the means for generating the video mode output signal coupled to the means for generating the first output signal and the means for generating the second output signal.

53. The apparatus of claim 52 wherein the means for generating the resolution signal further comprises:

means for comparing the value of the first output signal with a plurality of total line threshold values; and means for comparing the value of the second output signal with a plurality of active line threshold values.

54. A method of determining the resolution of a video data, comprising:

differentiating an active line in the video data from a blanking period in the video data;

generating an active line output signal that represents the number of active lines in a frame of the video data; and generating a resolution signal that represents the resolution of the video data, the resolution signal based upon the active line output signal.

55. The method of claim 54 wherein the step of generating the resolution signal further comprises the steps of:

comparing the value of the active line signal with a plurality of active line threshold values.

56. An apparatus for determining the resolution of a video data, comprising:

means for differentiating an active line in the video data from a blanking period in the video data;

coupled to the means for differentiating, means for generating an active line output signal that represents the number of active lines in a frame of the video data; and means for generating a resolution signal that represents the resolution of the video data, the means for generating the resolution signal responsive to the active lines output signal, the means for generating the resolution signal coupled to the means for generating the active line output signal.

57. The apparatus of claim 56 wherein the means for generating the resolution signal comprises:

means for comparing the value of the active line signal with a plurality of active line threshold values.

58. A method of determining the video mode of a video data, comprising the steps of:

comparing the number of total lines in a frame of the video data to a first range of total line threshold values;

if the number of total lines is outside than the first range of total line threshold values, then comparing the number of total lines to a second range of line threshold values;

if the number of total lines is within the first range of total line threshold values, then comparing the number of active lines in a frame of the video data to a first range of active line threshold values;

if the number of active lines is within the first range of active line threshold values, then indicating a first video mode value;

if the number of active lines is greater than the first range of active line threshold values, then indicating a second video mode value.

59. The method of claim 58 further comprising the step of:

if the number of total lines is within the second range of line threshold values, then comparing the number of active lines in a frame of the video data to a second range of active line threshold values;

if the number of active lines is within the second range of active line threshold values, then indicating the second video mode value; and if the number of active lines is beyond the second range of active line threshold values, the indicating a third video mode value.

60. An apparatus for determining the video mode of a video data, comprising:

first means for comparing the number of total lines in a frame of the video data to a first range of total line threshold values;

second means for comparing the number of total lines to a second range of total line threshold values if the number of total lines is beyond the first range of total line threshold values, the second means coupled to the first means;

third means for comparing the number of active lines in a frame of the video data to a first range of active line threshold values if the number of total lines is within the first range of total line threshold values, the third means coupled to the first means;

means for indicating a video mode value, the means for indicating the video mode value indicating a first video mode if the number of active lines is within the first range of active line threshold values, the means for indicating the video mode value indicating a second video mode if the number of active lines is outside the first range of active line threshold values.

61. The apparatus of claim 60 further comprising:

fourth means for comparing the number of active lines in a frame of the video data to a second range of active line threshold values if the number of total lines is within the second range of total line threshold values, the fourth means coupled to the second means;

the means for indicating a video mode value indicating the second video mode value if the number of active lines is within the second range of active line threshold values, the means for indicating the video mode value indicating a third video mode value if the number of active lines is beyond the second range of active line threshold values.

62. A method of displaying an image on a flat panel based upon video data processed within a computer unit, a plurality of synchronous signals being used in the transmission of the video data, the method comprising the steps of:

determining the number of total lines in a frame of the video data based upon the synchronous signals;

determining the number of active lines in a frame of the video data;

determining the video mode of the video data based upon the number of total lines and the number of active lines in a frame of the video data;

providing a signal representing the video mode of the video data and the video data to a processing unit for driving the flat panel display unit so that an image representative of the video data is displayed by the flat panel display unit.

63. A computer system which incorporates a flat panel display unit, comprising:

a flat panel display unit;

a computer unit for controlling the flat panel display unit, the computer unit including a video data source for producing video data, a video mode detection circuit for detecting the video mode of the video data based upon the total lines and the active lines per video frame, and a processing circuit coupled to the video mode detection circuit and capable of controlling the flat panel display unit;

the video mode detection circuit comprising:

a first counter stage capable of receiving synchronous signals transmitted with the video data and capable of generating a first counter stage output signal that represents the number of lines in a frame of the video data;

a second counter stage capable of receiving an active line indicator signal that indicates an active line in the video data, the second counter stage capable of generating a second counter stage output signal that represents the number of active lines in a frame of the video data; and a logic circuit coupled to the first counter stage and to the second counter stage, the logic circuit capable of detecting the video mode of the video data based upon the values of the first counter stage output signal and the second counter stage output signal.

64. An apparatus for detecting the video mode of a video signal comprising:

an active line counter stage capable of receiving an active line indicator signal that indicates an active line in the video data, the active line counter stage capable of generating an active line counter stage output signal that represents the number of active lines in a frame of the video data;

a logic circuit coupled to the active line counter stage and capable of detecting the video mode of the video data based upon the value of the active line counter stage output signal; and a comparator coupled to the active line counter stage and capable of receiving the video data and a video data threshold signal, the comparator capable of producing the active line indicator signal for input into the active line counter stage if the level of the video data is at least at the level of the video data threshold signal.

65. An apparatus for detecting the video mode of a video signal comprising:

an active line counter stage capable of receiving an active line indicator signal that indicates an active line in the video data, the active line counter stage capable of generating an active line counter stage output signal that represents the number of active lines in a frame of the video data;

a logic circuit coupled to the active line counter stage and capable of detecting the video mode of the video data based upon the value of the active line counter stage output signal;

the active line counter stage comprising:

a blanking line counter for counting blanking periods in a frame of the video data;

a counting enable controller for generating an output signal that permits the blanking line counter to begin the count of the blanking periods in a frame of the video data;

an active line output logic, coupled to the blanking line counter, for buffering an output of the blanking line counter.

66. A method of determining the resolution of a video data, comprising:

generating an active line output signal that represents the number of active lines in a frame of the video data; and generating a resolution signal that represents the resolution of the video data, the resolution signal based upon the active line output signal;

the step of generating the resolution signal further comprises:

comparing the value of the active line signal with a plurality of active line threshold values.

67. An apparatus for detecting the video mode of a video signal comprising:

an active line counter stage capable of receiving an active line indicator signal that indicates an active line in the video data, the active line counter stage capable of generating an active line counter stage output signal that represents the number of active lines in a frame of the video data;

a logic circuit coupled to the active line counter stage and capable of detecting the video mode of the video data based upon the value of the active line counter stage output signal; and a storage device for providing a video data threshold signal.

68. An apparatus for determining the resolution of a video data, comprising:

means for generating an active line output signal that represents the number of active lines in a frame of the video data; and means for generating a resolution signal that represents the resolution of the video data, the means for generating the resolution signal responsive to the active lines output signal, the means for generating the resolution signal coupled to the means for generating the active line output signal;

the means for generating the resolution signal comprising:

means for comparing the value of the active line signal with a plurality of active line threshold values.

* * * * *